(12) United States Patent
Izraelevitz et al.

(10) Patent No.: US 11,780,580 B2
(45) Date of Patent: Oct. 10, 2023

(54) PASSIVE AND ACTIVE STABILITY SYSTEMS FOR BALLISTICALLY LAUNCHED MULTIROTORS

(71) Applicant: California Institute of Technology, Pasadena, CA (US)

(72) Inventors: Jacob S. Izraelevitz, Pasadena, CA (US); Brett A. Kennedy, Altadena, CA (US); Amanda R. Bouman, Pasadena, CA (US); Daniel Pastor Moreno, Pasadena, CA (US); Matthew James Lindsay Anderson, Pasadena, CA (US); Paul M. Nadan, San Carlos, CA (US); Joel W. Burdick, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 261 days.

(21) Appl. No.: 17/067,397

(22) Filed: Oct. 9, 2020

(65) Prior Publication Data

US 2021/0107645 A1    Apr. 15, 2021

Related U.S. Application Data

(60) Provisional application No. 63/037,159, filed on Jun. 10, 2020, provisional application No. 62/912,989, filed on Oct. 9, 2019.

(51) Int. Cl.
*B64C 1/30* (2006.01)
*B64U 10/13* (2023.01)
(Continued)

(52) U.S. Cl.
CPC .............. *B64C 39/024* (2013.01); *B64C 1/30* (2013.01); *B64U 10/13* (2023.01); *B64U 30/12* (2023.01);
(Continued)

(58) Field of Classification Search
CPC ..... B64C 1/0683; B64C 1/30; B64C 2201/08; B64C 3/56; B64F 1/04; B64U 10/13; B64U 30/12; B64U 30/20; B64U 70/00
See application file for complete search history.

(56) References Cited

U.S. PATENT DOCUMENTS

| 2006/0011777 A1* | 1/2006 | Ariton | B64C 39/024 244/7 B |
| 2012/0205488 A1* | 8/2012 | Powell | B63G 8/30 244/63 |

(Continued)

FOREIGN PATENT DOCUMENTS

WO    WO-2017143501 A1 *  8/2017  .............. B64C 1/30

OTHER PUBLICATIONS

Jorgensen, L.H., "Prediction of static aerodynamic characteristics for space-shuttle-like and other bodies at angles of attack from 0 deg to 180 deg", National Aeronautics and Space Administration, Washington, D.C., Jan. 1973, pp. 1-50.

(Continued)

*Primary Examiner* — Brady W Frazier
*Assistant Examiner* — Shanna Danielle Glover
(74) *Attorney, Agent, or Firm* — Gates & Cooper LLP

(57) ABSTRACT

A ballistically launched foldable multirotor vehicle has a central body frame. A battery is located in an upper vertical location of the vehicle and positions a center of mass of the vehicle to provide aerodynamic stability during a launch. Fins are attached to the central body frame such that aerodynamic forces on the fins shift an aerodynamic center (AC) of the vehicle downward below the center of mass of the vehicle. Three or more foldable arms are attached to the central body frame via a hinge and exist in two states—a closed state where the foldable arms are parallel to a central body axis, and an open state (after launch) where the foldable arms extend radially outward perpendicular to the (Continued)

central body axis. Rotors mounted to each foldable arm are controlled by a motor to enable flight.

21 Claims, 16 Drawing Sheets

(51) Int. Cl.
    *B64U 30/12*       (2023.01)
    *B64U 30/20*       (2023.01)
    *B64U 70/00*       (2023.01)
    *B64C 39/02*       (2023.01)
    *B64U 50/19*       (2023.01)

(52) U.S. Cl.
    CPC .............. *B64U 30/20* (2023.01); *B64U 50/19* (2023.01); *B64U 70/00* (2023.01)

(56) References Cited

U.S. PATENT DOCUMENTS

| | | | | |
|---|---|---|---|---|
| 2017/0166306 | A1* | 6/2017 | Engbersen | B64C 25/52 |
| 2017/0267347 | A1* | 9/2017 | Rinaldi | B65D 81/3825 |
| 2018/0312252 | A1* | 11/2018 | Yates | B64C 3/56 |
| 2019/0077503 | A1* | 3/2019 | Reddy | B64C 3/56 |
| 2019/0176983 | A1* | 6/2019 | Darnell | B64C 25/52 |

OTHER PUBLICATIONS

Leishman, J.G., "Principles of helicopter aerodynamics with CD extra", Principles of Helicopter Aerodynamics, Cambridge University Press, 2006, p. 80, Copyright 2006.

"Coyote UAS", Raytheon Missiles & Defense, 2020, pp. 1-5, www.raytheon.com/capabilities/products/coyote, as downloaded Sep. 29, 2020.

"Hero uav", UVision, 2020, pp. 1-4, uvisionuav.com/main-products/, as downloaded Jan. 8, 2021.

"Horus—detail—Leonardo", Leonardo—Aerospace, Defence and Security, 2020, pp. 1-5, www.leonardocompany.com/en/all-products, as downloaded Jan. 8, 2021.

Gnemmi, P., et al., "Conception and Manufacturing of a Projectile-Drone Hybrid System", IEEE/ASME Transactions on Mechatronics, Apr. 2017, pp. 940-951, vol. 22, No. 2.

Henderson, L., et al., "Towards Bio-Inspired Structural Design of a 3D Printable, Ballistically Deployable, MultiRotor UAV", Aerospace Conference, 2017, IEEE, pp. 1-7.

"Mavic 2-dji store," DJI, 2020, pp. 1-3, store.dji.com/product/mavic-2, as downloaded Jan. 8, 2021.

"Drone camera 4k hdr Anafi," Parrot, 2020, pp. 1-6, www.parrot.com/us/drones/anafi, as downloaded Jan. 8, 2021.

"Poweregg", PowerEgg Camera Drone, Fly To The Future | PowerVision Robot, 2020, pp. 1-7, www.powervision.me/en/product/poweregg, as downloaded Jan. 8, 2021.

"LeveTop—The Foldable & Portable Drone", 2020, pp. 1-5, www.levetop.com, as downloaded Jan. 8, 2021.

"Ascent aerosystems", 2020, pp. 1-14, www.ascentaerosystems.com/, as downloaded Sep. 30, 2020.

Kornatowski, P.M, et al., "An origami-inspired cargo drone", 2017 IEEE/RSJ International Conference on Intelligent Robots and Systems (IROS), Sep. 2017, pp. 6855-6862.

"Mars helicopter to fly on nasas next red planet rover mission,", NASA, www.nasa.gov/press-release/mars-helicopter-to-fly-on-nasa-s-next-red-planet-rover-mission. May 2018, pp. 1-4, as downloaded Sep. 30, 2020.

"Mars helicopter to fly on nasas next red planet rover mission," The Johns Hopkins University Applied Physics Laboratory, 2018, pp. 1-2, dragonfly.jhuapl.edu, as downloaded Sep. 30, 2020.

Hoerner, S.F., "Fluid-dynamic Drag: practical information on aerodynamic drag and hydrodynamic resistance", Hoerner Fluid Dynamics, 1965, pp. 1-455.

Thurn, A., et al., "A Nichrome Burn Wire Release Mechanism for CubeSats", Proceedings of the 41st Aerospace Mechanisms Symposium, Jet Propulsion Laboratory, May 16-18, 2012, pp. 479-488.

Faessler, M., et al., "Automatic Re-Initialization and Failure Recovery for Aggressive Flight with a Monocular Vision-Based Quadrotor", 2015 IEEE International Conference on Robotics and Automation (ICRA), pp. 1722-1729.

Falanga, D., et al., "The Foldable Drone: A Morphing Quadrotor that can Squeeze and Fly", IEEE Robotics and Automation Letters, Nov. 2018, pp. 1-9, vol. 4, No. 2.

Bucki, N., et al., "Design and Control of a Passively Morphing Quadcopter", 2019 International Conference on Robotics and Automation (ICRA), pp. 1-7.

"Bleacher reacher mega t-shirt launcher", tshirtguns.com, tshirtgun.com/bleacher_reacher_mega_2014.pdf, as downloaded Jan. 8, 2021.

Brockers, R., et al., "Towards autonomous navigation of miniature UAV", Proceedings of the IEEE Conference on Computer Vision and Pattern Recognition Workshops, 2014, pp. 631-637.

Bloesch, M., et al., "Iterated extended Kalman filter based visual-inertial odometry using direct photometric feedback", The International Journal of Robotics Research 2017, pp. 1053-1072, vol. 36, No. 10.

\* cited by examiner

PASSIVE AND ACTIVE STABILITY SYSTEMS FOR BALLISTICALLY LAUNCHED MULTIROTORS

CROSS-REFERENCE TO RELATED APPLICATIONS

This application claims the benefit under 35 U.S.C. Section 119(e) of the following commonly-assigned U.S. provisional patent application(s), which is/are incorporated by reference herein:

Provisional Application Ser. No. 62/912,989, filed on Oct. 9, 2019, with inventor(s) Jacob Izraelevitz and Brett A. Kennedy, entitled "Squid (Streamlined Quick-Unfolding Investigator Drone): A Projectile-Launched Multirotor Vehicle Platform,"; and Provisional Application Ser. No. 63/037,159, filed on Jun. 10, 2020, with inventor(s) Brett A. Kennedy, Jacob Izraelevitz, Amanda Bouman, Daniel Pastor Moreno, Matthew J. Anderson, Paul M. Nadan, and Joel W. Burdick, entitled "Squid (Streamlined Quick-Unfolding Investigator Drone) Passive Stability System,".

STATEMENT REGARDING FEDERALLY SPONSORED RESEARCH AND DEVELOPMENT

This invention was made with government support under Grant No. 80NM0018D004 awarded by NASA (JPL). The government has certain rights in the invention.

BACKGROUND OF THE INVENTION

1. Field of the Invention

The present invention relates generally to launching small unmanned vehicles (UAVs), and in particular, to a method, system, and apparatus, for launching a multi-rotor vehicle that maintains stability throughout a flight process (from launch, through an unfolding transition, to flight).

2. Description of the Related Art (Note: This application references a number of different publications as indicated throughout the specification by reference numbers enclosed in brackets, e.g., [x]. A list of these different publications ordered according to these reference numbers can be found below in the section entitled "References." Each of these publications is incorporated by reference herein.)

Unmanned fixed-wing and multirotor aircraft are usually launched manually by an attentive human operator. Aerial systems that can instead be launched ballistically without operator intervention will play an important role in emergency response, defense, and space exploration where situational awareness is often required, but the ability to conventionally launch aircraft to gather this information is not available. To better understand these issues, a description of prior art needs and solutions with respect to unmanned aerial vehicles (UAVs) may be useful.

Firefighters responding to massive and fast-moving fires could benefit from the ability to quickly launch UAVs/drones through the forest canopy from a moving vehicle. This eye-in-the-sky could provide valuable information on the status of burning structures, fire fronts, and safe paths for rapid retreat. Likewise, military personal in active engagements could quickly deploy aerial assets to gather information as the situation evolves and may not have time to manually launch information gathering drones. Further, non-Earth planetary missions could benefit from UAVs to expand the data collection range of a rover, and enable access to sites that a rover would find impassible, while complying with a strict set of requirements for such planetary missions.

For fixed wing aircraft, there are several mature products for military applications, notably COYOTE from RAYTHEON with two sets of wings [1], HERO series from UVISION with its X-shaped wings [2], and HORUS from LEONARD which can be launched from a tank [3]. However, multirotor aircraft are advantageous over fixed-wing systems as they can hover in place and aggressively maneuver in cluttered environments to achieve greater vantage points. The rotating blades of the multirotor are a hazard to nearby personnel (who may be distracted by other obligations), a problem which is particularly present if the system is to launch autonomously without human supervision. In addition, takeoff is one of the most dangerous portions of a multirotor's flight, as it involves hazards to not only the multirotor but also other assets on the ground. A typical scenario would involve deployment from a windy roof, the bed of a truck, or a ship in waves. In these scenarios, the vehicle is stored for long periods of time and must quickly provide air support in the case of an unexpected event. Current drone designs are slow to deploy, require user intervention prior to takeoff, and cannot be deployed from a moving vehicle. Furthermore, traditional foldable designs require the user to unfold the arms, slowing the process and putting the user at risk. In the case of deployment from a moving vehicle, the drone also needs to be aerodynamically stable to avoid tumbling when exposed to sudden crosswinds. In the above-described situations, multirotor aircraft operating in crowded and rapidly changing environments need a precise, highly deterministic, and fully autonomous takeoff method to achieve a safe operating altitude away from assets and personnel.

A ballistic launch addresses the above problems by creating a pre-determined path for the multirotor away from higher-value assets, even in the case of aircraft failure. Ballistic launches also provide unique opportunities in the exploration of other bodies in the solar system (e.g., Mars and Titan). The Mars Helicopter Scout (MHS), which is to be deployed from the Mars 2020 rover, despite the thin atmosphere, will provide the first powered flight on another solar system body in history [12]. In addition to a ballistic launch, multi-rotor UAVs greatly expand the data collection range of the rover, allow access to sites that a rover would find impassible, but may have a multistep launch sequence that requires flat terrain. The current deployment method for the Mars Helicopter from the underbelly of the rover reduces ground clearance, resulting in stricter terrain constraints. Additionally, the rover must move a significant distance away from the helicopter drop site before the helicopter can safely take off.

The addition of a ballistic, deterministic launch system for future rovers or landers would physically isolate small rotorcraft from the primary mission asset, as well as enable deployment at longer distances or over steep terrain features. Moreover, the ballistic launch could loft the rotorcraft over steep slopes, offering access to important scientific targets such as recurring slop lineae. Aerial launch technology would even enable the aircraft to deploy directly from the entry vehicle during decent and landing, enabling it to land and explore sites a great distance from the rover.

In addition to Mars, Titan is another major candidate for rotorcraft flight where they could be deployed from landers, airships, or buoys, expanding the design space for future Titan missions. The Dragonfly mission proposal to the New Frontiers Program illustrates how rotorcraft can take advantage of the thick atmosphere and low gravity of Titan to fly to many different sites with the same vehicle [13]. Accordingly, it is desirable to have a launch on Titan that could be used for deployment of small daughter rotorcraft from landers, airships, or lake buoys, expanding the option space for Titan mission design.

In the application scenarios described above, ideally the multirotor is stored for extended periods of time ("containerized") before being launched quickly, safely, and autonomously. Furthermore, when deployed from a moving vehicle, the drone must be aerodynamically stable to avoid tumbling when exposed to sudden crosswinds. Most current drone designs however are slow to deploy, require user intervention prior to takeoff, and cannot be deployed from fast-moving vehicles. Current foldable designs also require the user to manually unfold the arms which slows the process and puts the user at risk if the multirotor prematurely activates. A multirotor that can launch from a simple tube and autonomously transition to flight would solve many of the shortcomings of conventional drone deployment strategies.

Accordingly, there is growing interest in developing ballistically launched small aircraft systems (sUASs), for applications in both emergency response and space exploration. For example, emergency response and security teams have a need to quickly deploy a multirotor from a moving vehicle in order to provide support and coverage. Again, while mature tube-launched fixed-wing aircraft and limited coaxial aircraft are already in active use [1]-[4], tube-launched rotorcraft (both co-axial and multirotor) are much rarer and primarily still in development [5].

Several consumer drones (e.g., the DJI MAVIC series [6] and PARROT ANAFI [7]) can be folded to occupy a small volume, but these designs cannot fit smoothly inside a launch system, and the unfolding is manual (and not automatic/autonomous). Other unfolding rotorcraft may be able achieve a cylindrical form factor: the POWER EGG from POWER VISION folds into an egg shape drone [8], the LEVETOP drone folds into a small cylinder [9], and the coaxially designed SPRITE from ASCENT AEROSYSTEMS packs into a cylinder shape [10]. Other designs get inspiration from origami [11]. However, the unfolding of such rotorcraft must be performed manually.

Automatic in-flight unfolding mechanisms for quadrotors, using both active [19] and passive [20] actuation, have been developed for the traversal of narrow spaces. However, to enable the ability to ballistically launch, these existing foldable platforms must be redesigned to withstand launch loads, the autopilot would have to be reconfigured, a mechanism must be added to automatically deploy the arms and/or propellers, and the design must be configured to maintain passive aerodynamic stability post-launch (while transitioning into active aerodynamic stability). Ballistically-launched aerial systems that combine an aerodynamically stable structure and a foldable airfoil system have been developed in coaxial rotorcraft [4] and multirotor [5] formats, but both designs are still in the theoretical design phase, and have yet to demonstrate a transition from ballistic to stabilized flight.

In addition to the above, it is desirable to have a system to counter the growing threat of small unmanned aerial systems (sUASs). However, sUASs are difficult to thwart using conventional weapons due to their small size, and are likewise not cost-effective to destroy using larger munitions. One potential solution is to deploy friendly, defensive interceptor sUASs to target and neutralize the attacking sUASs. More specifically, it would be useful to provide drones capable of rapid ballistic deployment from a portable launcher, which would enable ground or marine convoys to quickly respond to a sUAS threat and engage at a safe distance. Other desired capabilities may include the mass-deployment of drones for reconnaissance and other purposes in cluttered environments, or without human involvement.

In view of the above, what is needed is a ballistically launched foldable multirotor UAV with autonomous stabilization from launch through flight.

SUMMARY OF THE INVENTION

Embodiments of the invention overcome the problems of the prior art using a folding multirotor referred to as a streamlined quick unfolding investigation drone (SQUID). The SQUID multirotor transitions from a folded launch configuration to a fully controllable multi-rotor vehicle in midair after launch. The transition is accomplished via passive unfolding of the multi-rotor arms and an unfolding aerodynamic stabilization system that also doubles as the landing gear. Stabilization of the unfolded multirotor is a fully autonomous process.

One or more embodiments of the invention, provide for the operation of multirotors in crowded environments with a highly reliable takeoff method, as failures during takeoff can damage more valuable assets nearby. Embodiments utilize a ballistic launch system that imposes a deterministic path for the multirotor to prevent collisions with its environment, as well as increases the multirotor's range of operation and allows deployment from an unsteady platform. In addition, outfitting planetary rovers or entry vehicles with such deployable multirotors greatly extends the data collection capabilities of a mission. Embodiments provide a multirotor aircraft that is capable of transitioning from a ballistic launch configuration to a fully controllable flight configuration in midair after launch. The transition is accomplished via passive unfolding of the multirotor arms, triggered by a nichrome burn wire release mechanism. The design is 3D printable, launches from a three-inch diameter barrel, and has sufficient thrust to carry a significant payload. The system has been fabricated and field tested from a moving vehicle up to 50 mph to successfully demonstrate the feasibility of the concept and experimentally validate the design's aerodynamic stability and deployment reliability.

Further to the above, embodiments of the invention provide for an aircraft that can launch ballistically and convert to autonomous, free-flying drones that is used in applications in many areas such as emergency response, defense, and space exploration, where they can gather critical situational data using onboard sensors. Embodiments provide for an autonomously-stabilizing multirotor vehicle with an onboard sensor suite, autonomy pipeline, and improved aerodynamic stability margin compared to other embodiments. Thus, embodiments of the invention provide for a ballistically-launched, autonomously-stabilizing multirotor vehicle (SQUID) with an onboard sensor suite, autonomy pipeline, and passive aerodynamic stability. Further, embodiments provide for autonomous transition from passive to vision-based, active stabilization, confirming the multirotor's ability to autonomously stabilize after a ballistic launch in a GPS-denied environment.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1A:
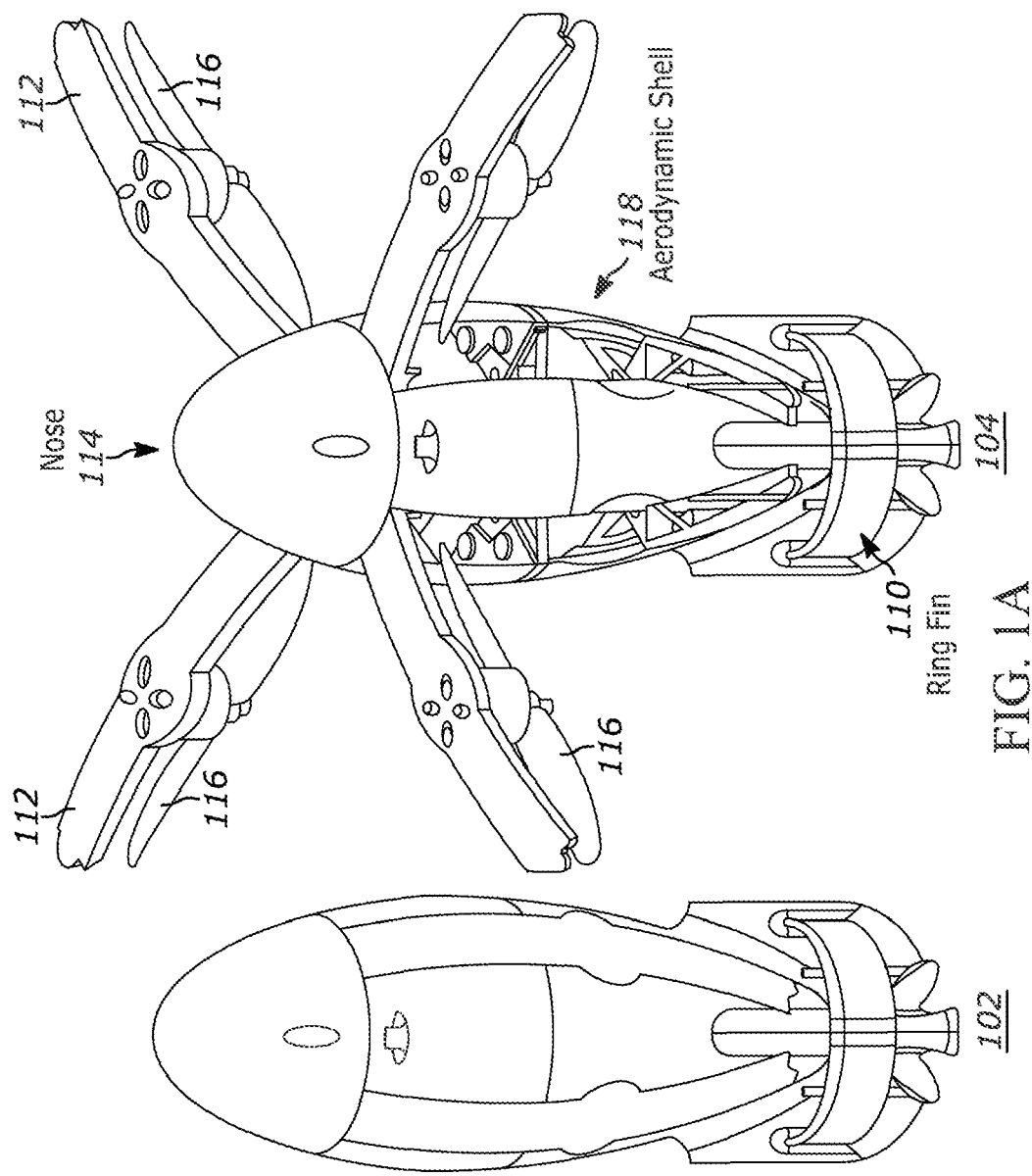
FIG. 1A illustrates a design of a streamlined quick unfolding investigation drone (SQUID) in different stages in accordance with one or more embodiments of the invention.
Figure 1A:
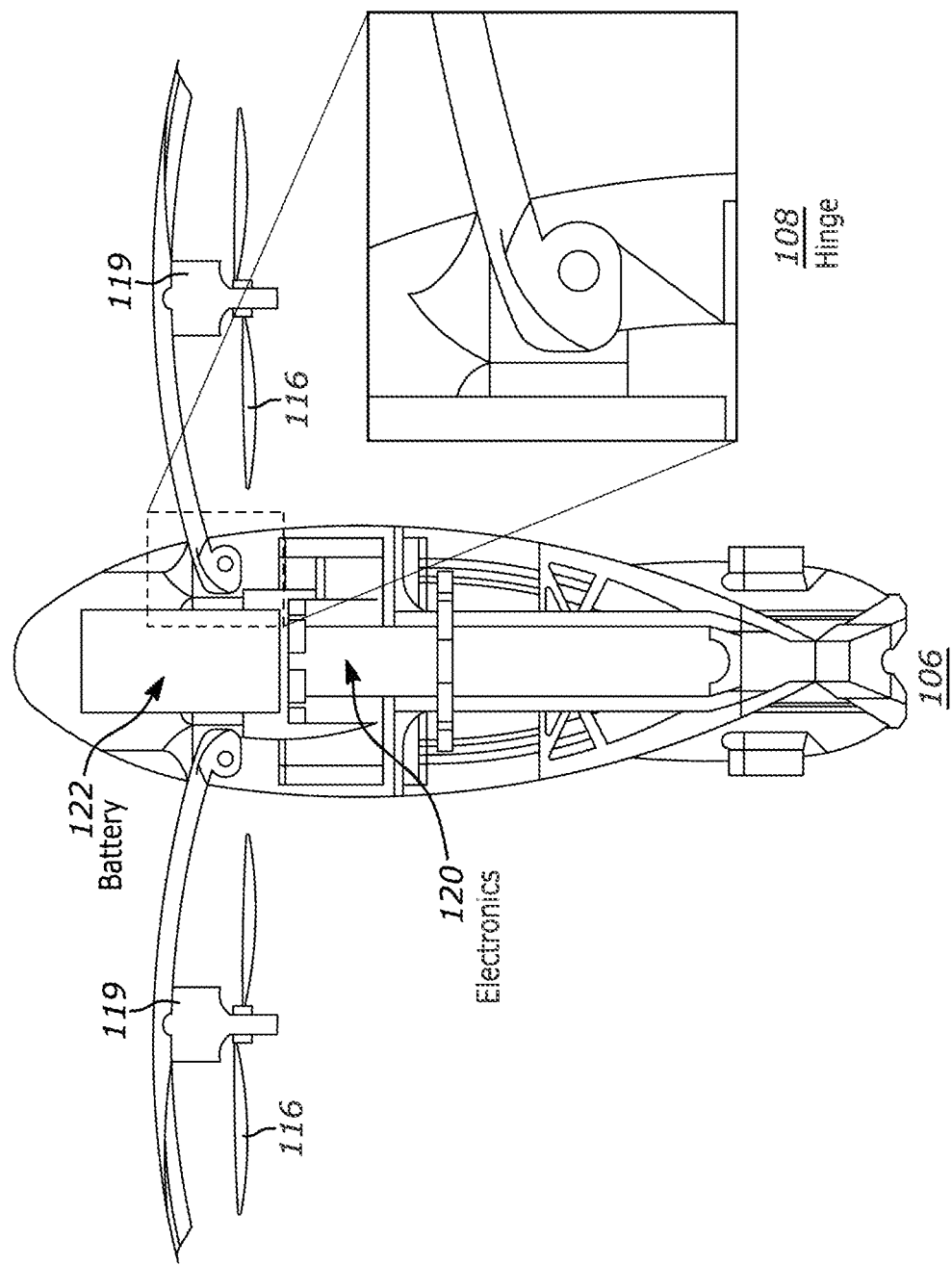

In the following description, reference is made to the accompanying drawings which form a part hereof, and which is shown, by way of illustration, several embodiments of the present invention. It is understood that other embodiments may be utilized and structural changes may be made without departing from the scope of the present invention.

The vehicle design may have various different embodiments. While some embodiments may be based on one or more requirements, other embodiments may be implemented without requirements or with a subset of the requirements. Two different primary embodiments are described herein.

Vehicle Embodiment One (1)

Design

Requirements for the first design option may include: (a) it will be launched from an approximately 3 inch tube (70-85 mm) (although different size tubes and/or no tube may be utilized); (b) it should fly ballistically to reach an altitude of 10 m; (c) it should be able to stabilize its flight after launch. In addition, (d) it should be a multirotor, and (e) it should be able to carry a payload of 200 g.

From this set of requirements, one can derive functional requirements that help the design process: the first requirement sets a form factor and, combined with requirement (d), requires that the vehicle be able to deploy its arms that hold the rotors. Requirement (a) also implies high vertical loads during launch, which will drive the structural design. Requirement (e) does not constrain the design space, as the vehicle is more volume limited than thrust limited.

This design focuses on the new challenges compared to a standard multirotor: first, the limited volume reduces the number of possible choices for most of the components. Second, the arms are not rigidly attached to the body. This will induce vibrations that affect the structure and control. Lastly, the strong vertical acceleration during launch imparts a large axial load on the multirotor. The main consequence of this high acceleration is the need to reinforce the structure, as well as ensure all components are properly secured and electrical connectors are tightly locked. Table 1 provides a summary of the main design figures and Table 2 contains a list of key SQUID components.

TABLE 1

| System Properties | |
|---|---|
| Property | Value |
| Mass | 530 g |
| Inertia about yaw axis, folded | $0.410^{-3}$ kg m$^2$ |
| Inertia about yaw axis, unfolded | $2.310^{-3}$ kg m$^2$ |
| Inertia about pitch axis, folded | $2.010^{-3}$ kg m$^2$ |
| Inertia about pitch axis, unfolded | $1.610^{-3}$ kg m$^2$ |
| Length | 270 mm |
| Folded Diameter | 83 mm (≈3 in) |
| Maximum amperage | 38 A |
| Thrust at hovering | 28% |
| Launch speed | 15 m/s |

TABLE 2

| Key Squid Components | | | |
|---|---|---|---|
| Component | Name | Weight (g) | Quantity |
| Autopilot | Pixracer running PX4 | 14 | 1 |
| Motor | T-Motors Air40 | 24 | 4 |
| ESC | T-Motors F30A | 7 | 4 |
| Propeller | DAL 5050 | 4 | 4 |
| Receiver | FrSky R-RXR | 1.2 | 1 |
| Battery | Tattu 850 mAh | 104 | 1 |
| Power board | ACSP7 | 15 | 1 |
| Frame | Custom | 181 | 1 |
| Arms | Custom | 16 | 4 |

Vehicle Sizing and Aerodynamic Design

Figure 1B:
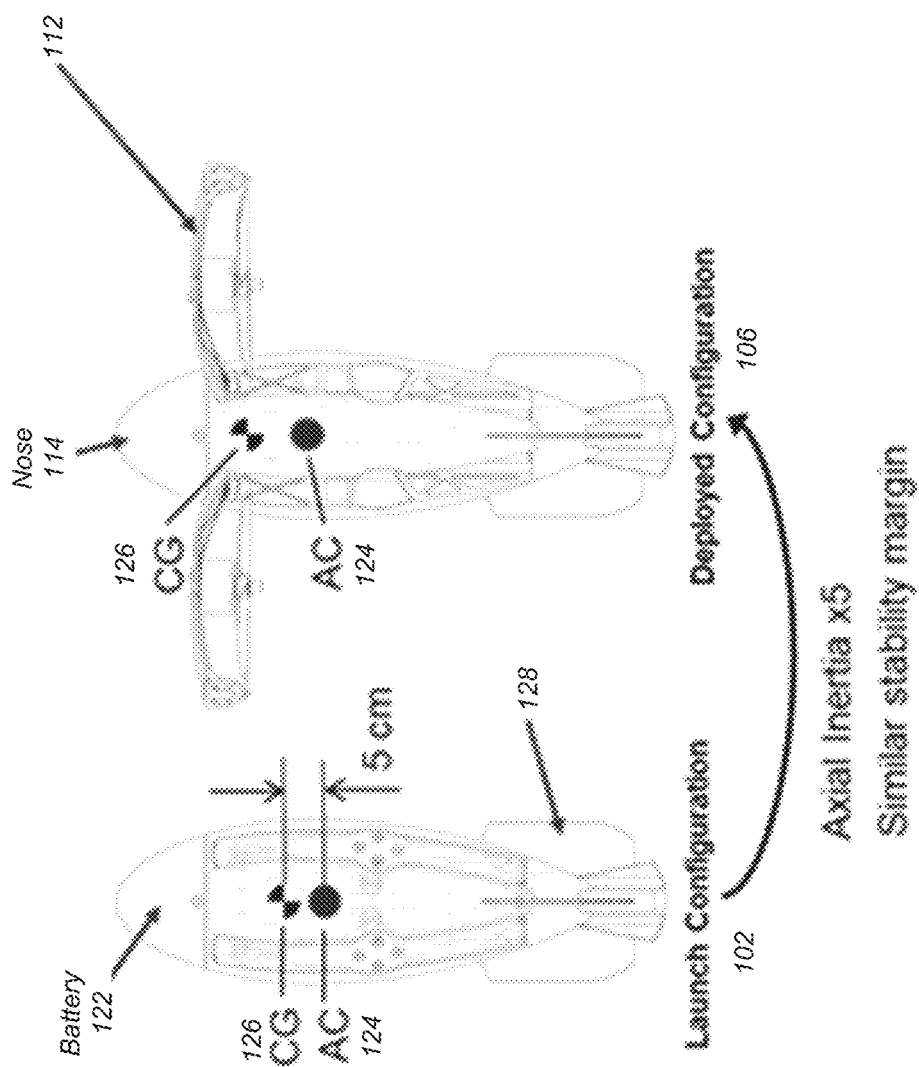
FIG. 1B illustrates the key design elements of the design from a launch configuration to a deployed configuration in accordance with one or more embodiments of the invention.

Due to the launcher diameter constraint, the outer shell is designed in a compromise of internal volume, air drag, and stability (see FIGS. 1A and 1B for the selected shape). In this regard, FIG. 1A illustrates a design of a SQUID in different stages in accordance with one or more embodiments of the invention. The different stages are illustrated from left to right: ballistic configuration view 102, multirotor configuration view 104, and section view 106 with a hinge zoom/closer look 108. The individual components of the design will be described below. Similarly, FIG. 1B illustrates the key design elements of the design from a launch/ballistic configuration 102 to a deployed/multirotor configuration section view 106 in accordance with one or more embodiments of the invention. In particular the aerodynamic center (AC) 124 remains behind the center-of-mass (i.e., (measured) center of gravity 126) for the entire deployment, enforcing a passive stability not seen in other platforms. In this regard, the center of gravity 126 is in front of the aerodynamic center 124 positioned with respect to the light arms 112. Further, the battery 122 is illustrated in front (e.g., in the aerodynamic nose 114) with the fins 128 to provide further stability.

Figure 2:
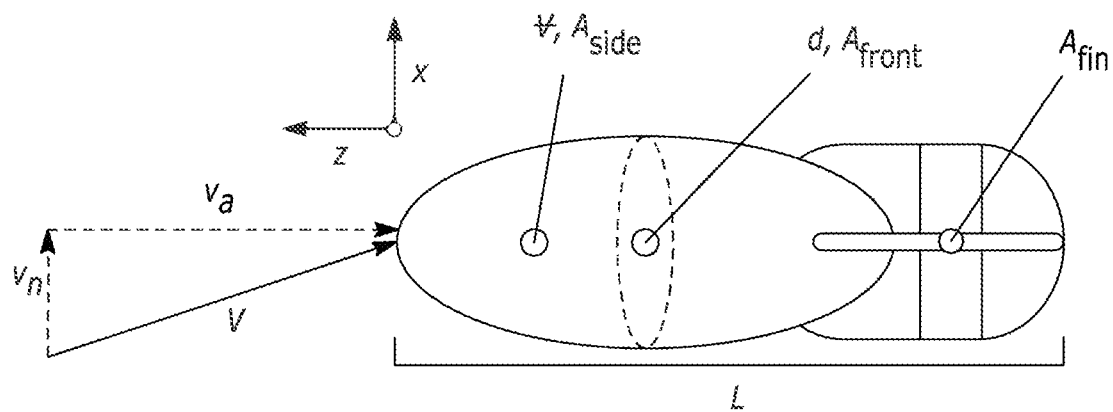
FIG. 2 illustrates the aerodynamic nomenclature that may be used in accordance with one or more embodiments of the invention.

FIG. 2 illustrates the aerodynamic nomenclature that may be used in accordance with one or more embodiments of the invention. Insights from classical projectile design [14][15] may be used to estimate aerodynamic forces and moments as:

$$M_{munk} = \rho v_a v_n \forall (1-d/L) \quad (1)$$

$$F_{base,n} = \rho v_a v_n A_{front} C_{d,front} \quad (2)$$

$$F_{lift,n} = \tfrac{1}{2} \rho v_a v_n A_{fin} C_{1\alpha,fin} \quad (3)$$

$$F_{side,n} = \tfrac{1}{2} \rho v_n v_n A_{side} C_{d,side} \quad (4)$$

Where $F_{base,n}$, $F_{lift,n}$, and $F_{side,n}$ are the components of the base drag, fin lift, and side drag taken normal to the primary axis of the body, and $M_{munk}$ is the Munk moment. Symbols, v, v, v and $\forall$ are the air density, axial and normal velocities, length, diameter, and volume respectively. Equations 1-4 are applicable for the designed SQUID model (a mildly streamlined body operating beyond turbulent transition) [14], but are not expected to apply to substantially smaller, slower, or smoother aircraft that may be more Reynolds-sensitive. The aerodynamic center, which should be placed as near the nose as possible for passive stability, is given by:

$$z_{AC} = \frac{-M_{munk} + F_{base,n}L + F_{fin,n}L + F_{side,n}L/2}{F_{base,n} + F_{lift,n} + F_{side,n}} \quad (5)$$

The Munk moment is unstable and grows with the object's volume, while both the drag and fin lift are generally stabilizing. Accordingly, both standard fins and a ring-fin 110 may be required to lower the aerodynamic center (and increase fin structural integrity) to compensate for the low-drag high-volume design. The estimated aerodynamic center location of the final design resides at roughly 65% of the folded SQUID length, leading to stable damped pitch oscillations of 0.6s period and stability margin of 5 cm.

The arm 112 deployment has three effects related to aerodynamic stability: it moves the center of mass 3 cm towards the nose 114 (increasing stability), it increases both the axial and normal drag (increasing damping but also shifts the aerodynamic center 3 cm towards the nose 114 due to the arm 112 location), and it increases the yaw inertia by a factor of 5 (decreases yaw rate due to conservation of angular momentum). The net effect maintains stability during the transition to flight geometry. Deliberate spin-stabilization during launch was rejected for ease of piloting and to simplify the transition dynamics between launch and flight. The design was experimentally validated as described below.

Propeller 116 and Motor Selection

The next step is to select the electrical components. The propeller size can be derived for ideal disc loading at hover [16]:

$$\frac{mg}{4\pi r_{prop}^2} = \frac{1}{2} \rho v_{tip}^2 (\sigma_{prop} C_{d0,prop}/k_{prop})^{2/3} \quad (6)$$

Where $\sigma_{prop} \approx C_{d0,prop} \approx k_{prop} \approx 1.25$ are rough estimates of the propeller solidity, nominal drag coefficient, and induced loss factors. Assuming a tip speed of $v_{tip}=100$ m/s at hover (Mach 0.3), the ideal propeller size for hover with payload is around 6 or 7 inches. However, given the strong volume constraints for a passively stable aeroshell 118 that folds within the launch tube, one may only choose the biggest propeller 116 accommodated in the full system design, in this case 5 inches in diameter. This still gives us a large margin of excess thrust for operations using racing motors designed for smaller propellers. Knowing the propeller size, one selects the motor 119 (e.g., the AIR40 from TMOTORS) sufficient to drive this propeller 116 and it has a good compromise of responsiveness and efficiency. Note that, despite the fact that flight time is not a requirement for this vehicle and therefore the design is not optimized for it, the battery 122 was selected as the biggest battery that can be accommodated in the given space, in this case a TATTU 850 mAh. The available space had a 32 mm×32 mm rectangular space and it limited battery 122 selection.

Component Placement:

The heaviest component, the battery 122, is placed as close to the nose 114 as possible to increase the center of mass vertical location. This will increase aerodynamic stability during the ballistic launch [14]. The rest of the electronic components 120 are placed directly below the battery 122: autopilot, BEC (battery eliminator circuit) and radio receiver. In addition, the ESC (electronic speed controller) are placed on each arm 112 to avoid the limited space on the core and the radio antennas are extended to the bottom core piece for improved radio signals. Similarly, the GPS module is situated on top of the battery 122 for better coverage.

Structure Design:

The main structural load for SQUID is due to the vertical acceleration from launch. From early experiments, a vertical acceleration of 50G's (490 m/s$^2$) was measured to meet the height requirement with a sub-meter acceleration distance. This acceleration will appear as a volumetric force to all components. In particular, the main structure was designed to connect the inertial load from the battery 122, situated at the top and the heaviest component, to the launcher at the bottom. The 3D printed parts were printed using high impact resistance materials, using the MARKFORGE printer with Onyx and carbon fiber. Another important load is due to arm 112 unfolding. Limited space prevents the addition of additional material to make the arms 112 more rigid, and the curved surface limits the use of traditional CNC (computer numerical control) methods. Another benefit of 3D printed carbon fiber is the added rigidity, which may be needed in a design in order to provide a tight fit when the arms 112 are folded.

Hinge Design:

The hinges 108 allow the arms 112 to rotate freely after release and limit their movement so that the propellers 116 are horizontal during normal flight. The unfolding limit is set by a mechanical stop. The hinges 108 each hold a torsion spring that push the arms 112 to open after their release. During normal flight, the springs are strong enough to maintain open the arms 112 and provide resistance against vertical disturbances. An overly stiff spring creates large shock loads during arm 112 unfolding. During launch, the arms 112 fold to slightly beyond 90° from their open posture so that the propellers 116 are tilted inside the body to allow more space at the top for the electronics 120. As described herein, in one or more embodiments, there are three or more foldable arms 112 that are each attached to the central body frame via a hinge 108.

Figure 3:
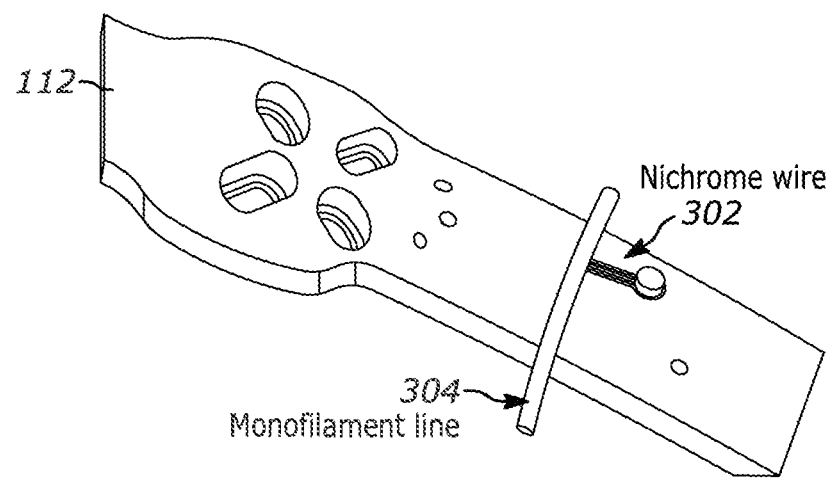
FIG. 3 illustrates the details for an exemplary (delay-arm) release mechanism that may be utilized in accordance with one or more embodiments of the invention.

Release Mechanism:

FIG. 3 illustrates the details for an exemplary (delay-arm) release mechanism that may be utilized in accordance with one or more embodiments of the invention. While several potential release mechanisms were considered, including designs employing electromagnets and servo motors, one or more embodiments may utilize a nichrome burn-wire trigger due to its reliability, efficient use of space, low susceptibility to G-forces, and low mass. Current passing through the nichrome wire 302 causes it to heat up and cut through a restraining loop of nylon monofilament line 304. This technique has been previously used on CubeSats, proving effective in both Earth atmosphere and vacuum [17]. The greatest downside of a nichrome release mechanism is the inconvenience of manually replacing the monofilament line 304 after every launch, so the mechanism was designed for ease of access. A shallow groove runs around the circumference of the SQUID in its ballistic configuration to hold a loop of monofilament line 304 in place. The tension in the arms 112 causes them to push outwards against the line 304, but the chosen line 304 is strong enough to withstand both the spring and launch forces without snapping. Mounted on one of the arms 112 is a length of nichrome wire 302, held under tension by screw terminals that have been heat-set into the arm 112. The nichrome wire 302 presses against the line 304, so that when heated it severs the line 304 and releases the spring-loaded arms 112.

Operations

Figure 4:
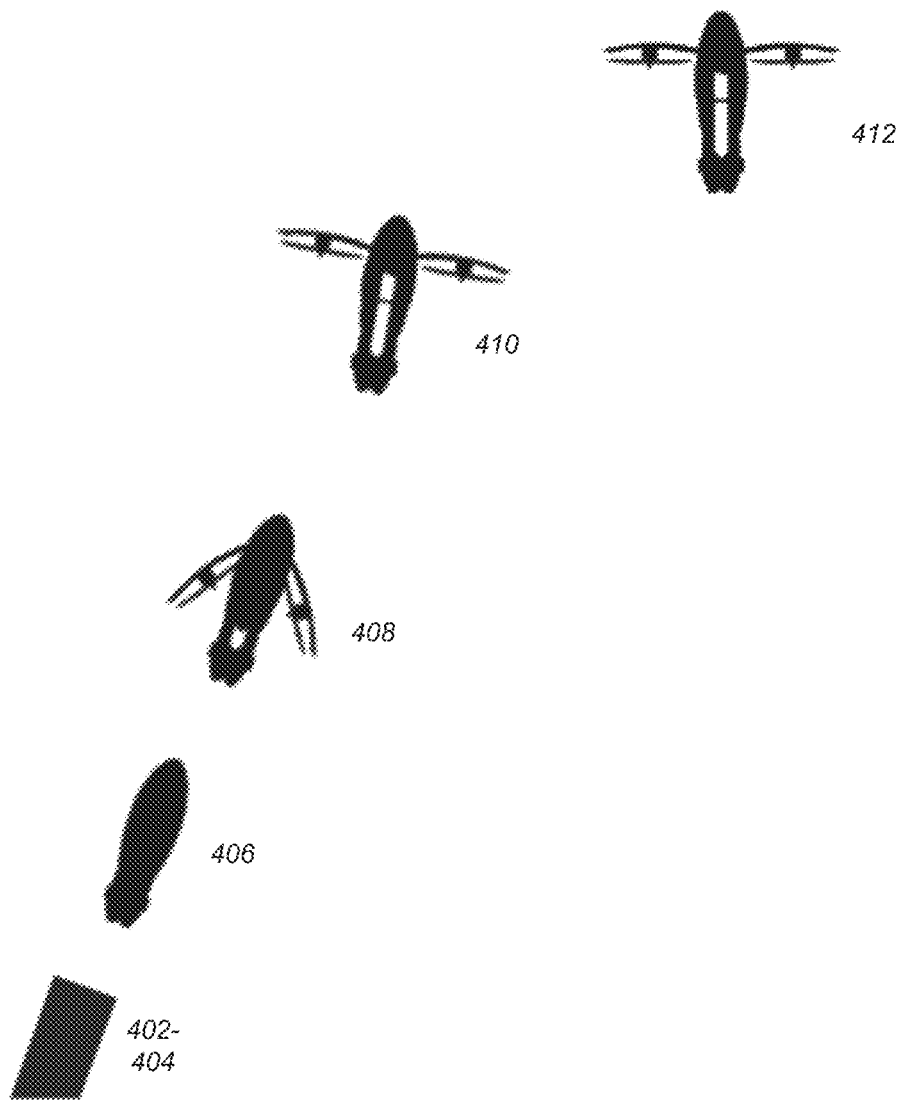
FIG. 4 illustrates the deployment sequence of the different phases in accordance with one or more embodiments of the invention.

The operation of SQUID is composed of six different phases from loading to controlled flight. FIG. 4 illustrates the deployment sequence of the different phases in accordance with one or more embodiments of the invention.

Phases 402-404 provide for the resting and launch inside the barrel.

Phase 402—Resting inside the launching device: The vehicle is static and ready to be launched. Before this phase, the vehicle has been turned on and armed. In order to keep compatibility with the rest of the flight control software (e.g., PX4) stack, the vehicle may be set to "kill" mode in order to neglect all input commands.

Figure 5:
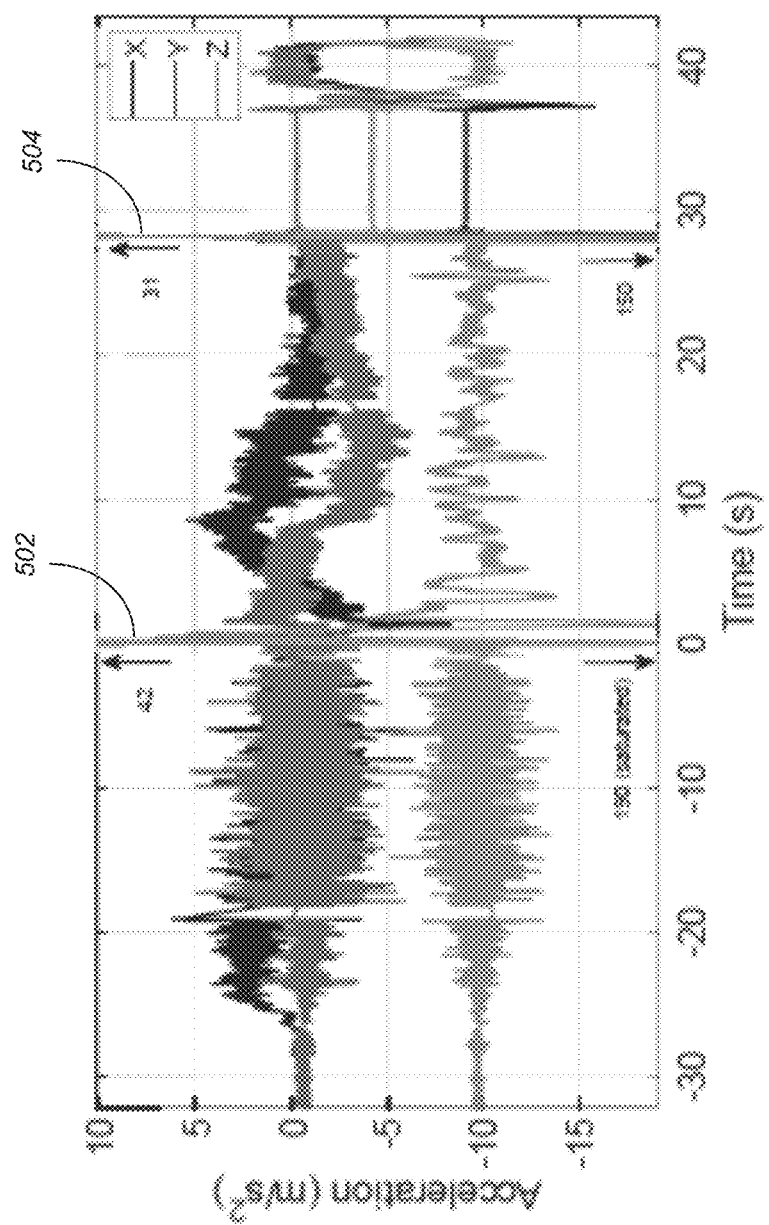
FIG. 5 shows a typical acceleration profile throughout operation of a moving vehicle in accordance with one or more embodiments of the invention.

Phase 404—Acceleration inside the barrel: After launch is triggered, the compressed air accelerates the vehicle through a 76 cm barrel with high g forces. This acceleration can be used by the autopilot to detect the launch. FIG. 5 shows a typical acceleration profile throughout operation of a moving vehicle in accordance with one or more embodiments of the invention. As illustrated, the x-axis is pointing forward, the z-axis is pointing up, and time starts when the vehicle is launched. At −25 s before launch, the vehicle accelerates to 80 km/h (50 mph) which can be seen as a constant acceleration on the x-axes. An acceleration spike 502 on the z-axis corresponds to the launch acceleration. Embodiments may utilize a pneumatic ZS740 baseball pitching machine from ZOOKA, which can realize 15 m/s (35 mph) muzzle velocity for the described SQUID prototype. After that, the acceleration is very noisy due to the bumpy road.

Phase 406—Unpowered flight: After launch, SQUID travels at high speeds and follows a parabolic (e.g., ballistic) trajectory. In the case of a moving vehicle launch, SQUID's relative velocity is the composition of the launch speed and the moving vehicle speed. During the flight, the z acceleration is close to negative one-g (9.8 m/s$^2$) indicating level flight, and the x and y acceleration commanded by the pilot compensate for the initial 50 mph vehicle speed.

Phase 408—Arms deployment: The folded arms 112 are initially retained by the monofilament line 304. They open when a relay actuates the nichrome burn wire 302. Without the monofilament line 304, the torsion spring deploys the arms 112. While arm deployment angle is not controlled, the arms 112 fully deploy in 70 ms, but they recoil by up to 30° before the motion is damped.

Phase 410—Stabilization: The pilot sends the command to "unkill" the drone and it automatically orients itself to the hovering attitude. For convenience, in the current SQUID prototype, the pilot may compensate for altitude and lateral motion, but the vehicle includes a GPS for waypoint navigation. Alternative embodiments may be being designed to provide autonomous stabilization using vision-based methods, which requires a larger volume to house a computer vision camera, 1D lidar and a bigger on-board computer (see below). In [18], the authors implement an algorithm to recover midair using on-board sensors. SQUID requires a similar approach but the speeds are much greater.

Phase 412—Standard Multirotor Controlled Flight: After SQUID stabilizes, it operates as a normal multirotor. Embodiments may carry different batteries depending on the mission length and/or may be optimized for long battery life. While SQUID does not have dedicated landing legs, it can safely land if the bottom touches the ground first at a low speed. It naturally falls to one side without damaging any component. Referring again to FIG. 5, there is another spike 504 29 s (after the launch spike 502) when the vehicle lands and tilts sideways onto its arms. Another landing method is to grab the bottom part of SQUID.

Field Testing

A set of tests may be used to verify SQUID's capabilities. Three stepping stones during development are described herein.

Aerodynamic Test:

A mass model may be used to evaluate aerodynamic effects in the vehicle prior to integrating electrical components, slowly increasing the fin size within volume constraints until enough stability margin was achieved for the test conditions. The selected shape includes a ring-fin 110 for added stability and structural integrity.

Delayed Deployment Test:

This test demonstrates deployment from a static launcher. During such a test, 20 ms after deployment the arms 112 were still closed and the vehicle was moving straight up in the canon direction. Around 70 ms after launch the arms 112 were deployed with the vehicle still moving up. As the body was passively aerodynamically stable, it predictably orients itself against its relative velocity, and by 200 ms, the vehicle is oriented upwind. At approximately 700 ms, the vehicle is already stable and hovering.

Scaling

When designing a ballistic launch for a different-sized SQUID (larger tube diameter, etc.), the following non-dimensionalized argument can be used to predict the aerodynamic performance. This analysis broadens the scope of the above described field testing conclusions, which can then be applied to other aircraft given the appropriate scaling.

The launch trajectory of the multirotor must be a function of an input variable set; namely the launch velocity (U), vehicle velocity ($U_{vehicle}$), air properties (density and viscosity $\rho$ and $\mu$), gravity (g), time (t), and the geometry of the aircraft (mass m, diameter d, length L, inertia I). Given that these input variables can be expressed using three independent physical units (mass, time, and length), one can describe the same equations using three fewer non-dimensional variables than input variables. The following non-dimensional variables accordingly span the input space:

$$\tilde{t} = \frac{tU}{L}, Fr = \frac{U}{\sqrt{gL}}, Re = \frac{\rho UL}{\mu}, \quad (7)$$

$$\tilde{U}_{vehicle} = \frac{U_{vehicle}}{U}, \tilde{m} = \frac{m}{\rho L^3}, \tilde{d} = \frac{d}{L}, \tilde{I} = \frac{I}{\rho L^5} \quad (8)$$

Where Fr is the Froude number and Re is the Reynolds number. Further nondimensional groups can represent the fin area ratio $A_{fin}/L^2$ etc. and other geometry details, but are generally held consistent for exact scale models. Reynolds number Re effects are expected to be minimal and can be neglected for models scaled by a single order-of-magnitude, as drag coefficients are only weakly dependent on Re given the fully transitioned flow and only partial streamlining of the model [14].

Finally, the trajectory during launch (position x(t), y(t),), z(t) and rotation R(t)) once non-dimensionalized can only be a function of these input groups. For example for x(t):

$$\tilde{x}(\tilde{t}) = \frac{x(\tilde{t})}{L} = f_x(\tilde{t}, Fr, \tilde{U}_{vehicle}, \tilde{m}, \tilde{d}, \tilde{I}) \quad (9)$$

Accordingly, the trajectory of the current SQUID prototype launched at 35 mph from a 50 mph vehicle (Fr=, d̃=, Ũ$_{vehicle}$=1.4) can be used to predict trajectories for scaled prototypes. For example, a 2× scale model (i.e. 8 times the weight, 32 times the inertia, etc.) launched at 50 mph from a 70 mph vehicle will match these same non-dimensional inputs. Such a model would therefore follow the same trajectory scaled by 2× the distance and take $\sqrt{2}$ times amount of time to do so.

Capabilities

The SQUID embodiments described above have proven capable of ballistic launch, stable midair deployment, and controlled flight under manual control. A functional prototype was built and tested using commercial electronic components with a 3D printed structure. Several fully operational flights showed the benefits of the approach, both from static and mobile vehicles.

Additional embodiments include increasing automation of the launch process. The trigger mechanism can be activated automatically after a predefined amount of time after the flight controller registers the massive launch acceleration, rather than manually by the pilot. Additionally, while the vehicle is capable of autonomous flight using the GPS, a non-metallic launcher tube would allow GPS use from launch. In addition, embodiments of the invention may be adapted to larger scale Earth models or mission-specific versions for Mars and Titan [13].

Vehicle Embodiment Two (2)

Embodiment 1 above describes a small prototype, a folding quadrotor that launches from a 3-inch tube to a height of 10 m or more, and then passively unfolds to a fully functional multirotor when triggered by a nichrome burn wire release mechanism. Such embodiments introduce the basic aerodynamic principles and structural design concepts required to sustain the g-forces associated with a ballistic launch. A prototype was fabricated and ballistically launched from a vehicle moving at speeds of 80 km/h (22 m/s). However, the multirotor was stabilized by a remote pilot after the ballistic launch phase.

Embodiment 2 provides a larger prototype that can launch from a 6 inch-diameter tube, propelled by expanding $CO_2$. Embodiment 2 also demonstrates autonomous self-stabilization after the ballistic phase. Moreover, embodiment 2 demonstrates that the vehicle can carry a significant sensor payload (illustrating that ballistically launched multirotors can carry out useful missions), and transitions from a folded, 6 inch-diameter (152.4~mm) launch configuration to an autonomous, fully-controllable hexacopter (or any multirotor with three (3) or more rotors) after launch. The entire process from launch to stabilization requires no user input and demonstrates the viability of using ballistically-launched multirotors for useful missions.

The description below reviews embodiments of the larger design focusing on key changes from the first vehicle embodiment, describes the ballistic launch phase, describes scale-model testing used to validate the vehicle's passive stabilization design, and details the autonomous stabilization procedure. A summary of the experiments demonstrate the passive-to-active stabilization pipeline.

Mechanical Design

The mechanical design of the second embodiments of SQUID prototype is dictated by three broad functional requirements. The multirotor must: (i) launch from a tube (6-inch diameter for this prototype), (ii) travel ballistically to a predetermined height, and (iii) autonomously transition into stable, multirotor flight. To satisfy these non-traditional flight requirements, embodiments of the invention blend design elements from both ballistic and multirotor platforms. The multirotor's central rigid body houses a battery and the perception and control systems, and interfaces with six fold-out arms with rotors and three fold-out fins which passively stabilize the multirotor during ballistic motion. However, fewer arms/rotors (e.g., three or more arms/rotors) may be utilized in accordance with embodiments of the invention. Further, a different number of fins may also be utilized.

Figure 6:
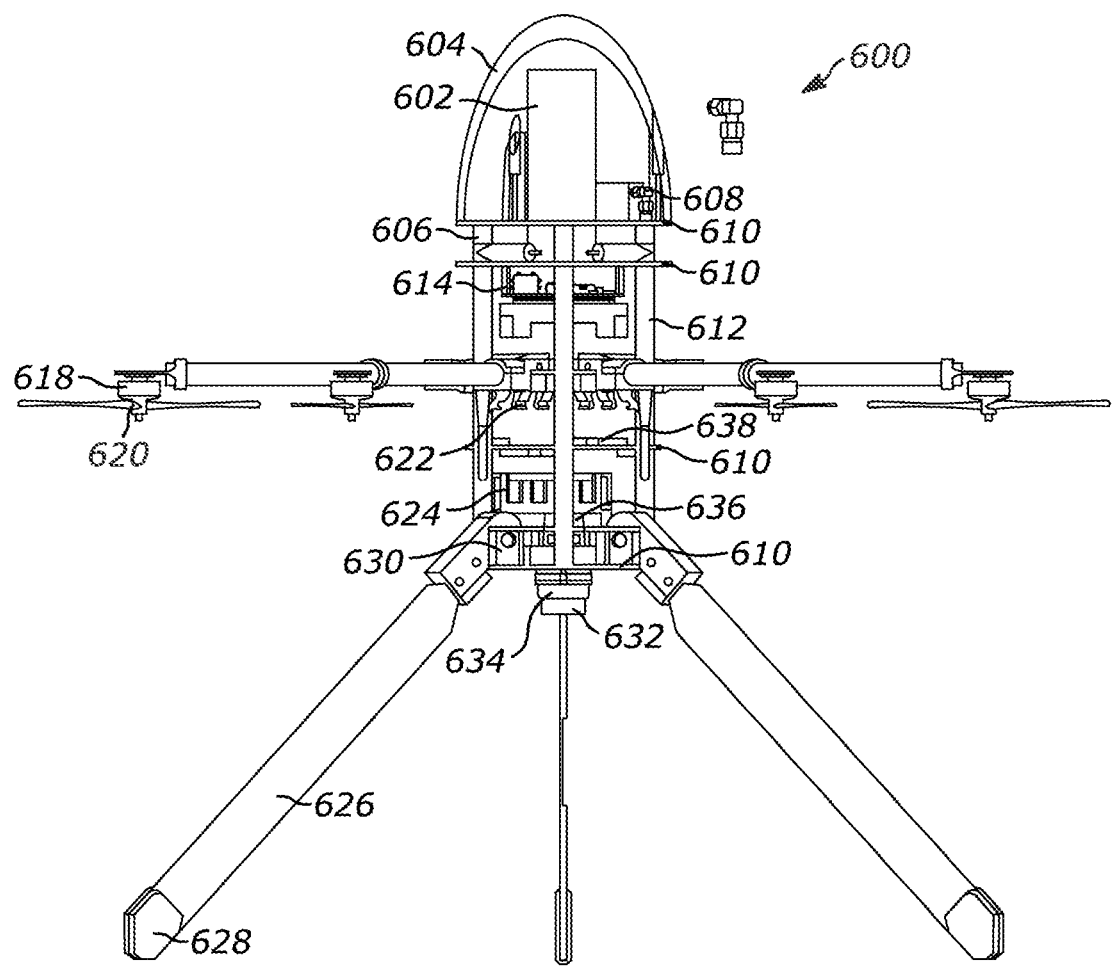
FIG. 6 illustrates a layout of key components of a vehicle in accordance with one or more embodiments of the invention.

The layout of key components is illustrated in FIG. 6. Illustrated in the vehicle 600 of FIG. 6 is the battery 602, nosecone 604, support column 606, telemetry 608, plate 610, WiFi antenna 612, onboard computer 614 (e.g., TX2), arm 616, motor 618, propeller 620, flight controller/autopilot system 622 (e.g., PIXRACER), USB Hub 624, fin 626, landing gear 628, receiver 630, camera 632, sensor/rangefinder 634 (e.g., a TERARANGER sensor), navigation system/sensor/IMU (inertial measurement unit)/barometer 636 (e.g., VECTORNAV), and ESC (electronic speed controller) 638. The onboard computer 614 may receive input from the various sensors 632-638. Further, the onboard computer 636 may include a processor, memory, and/or other components that enable the computer 636 to execute a set of instructions thereby autonomously stabilizing the vehicle 600 and/or controlling vehicle flight.

Figure 7A:
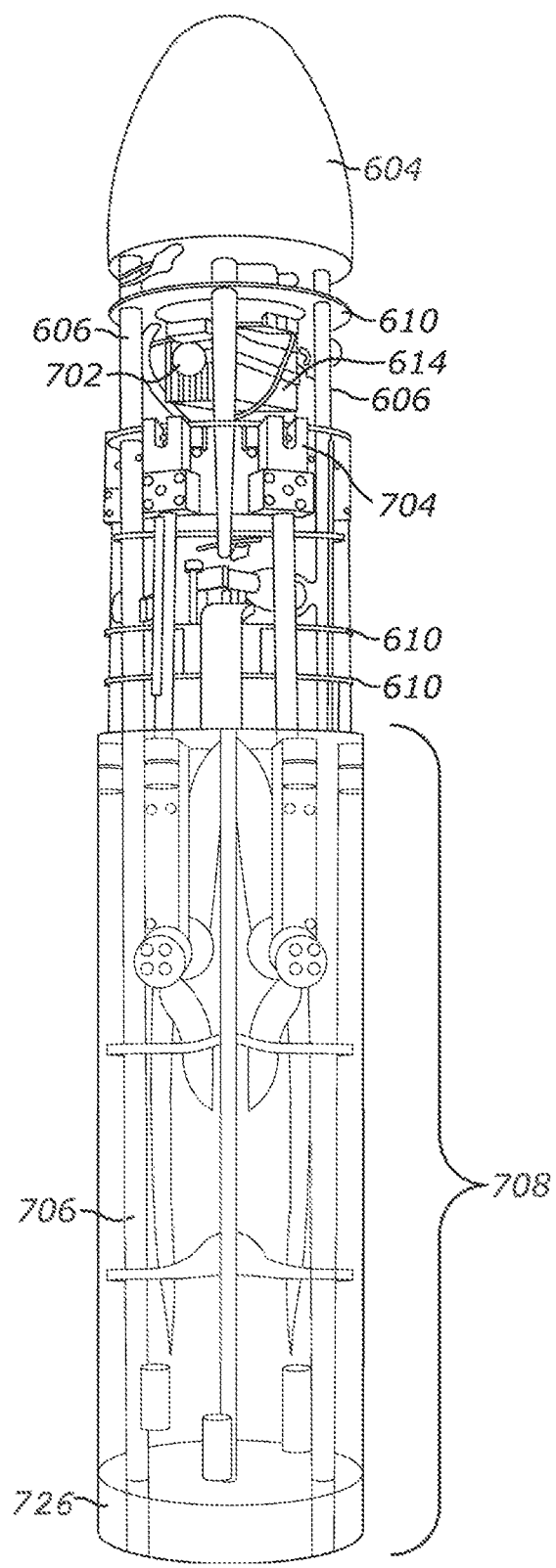
FIGS. 7A-7C illustrate a vehicle configuration in folded and deployed states in accordance with one or more embodiments of the invention.
Figure 7B:
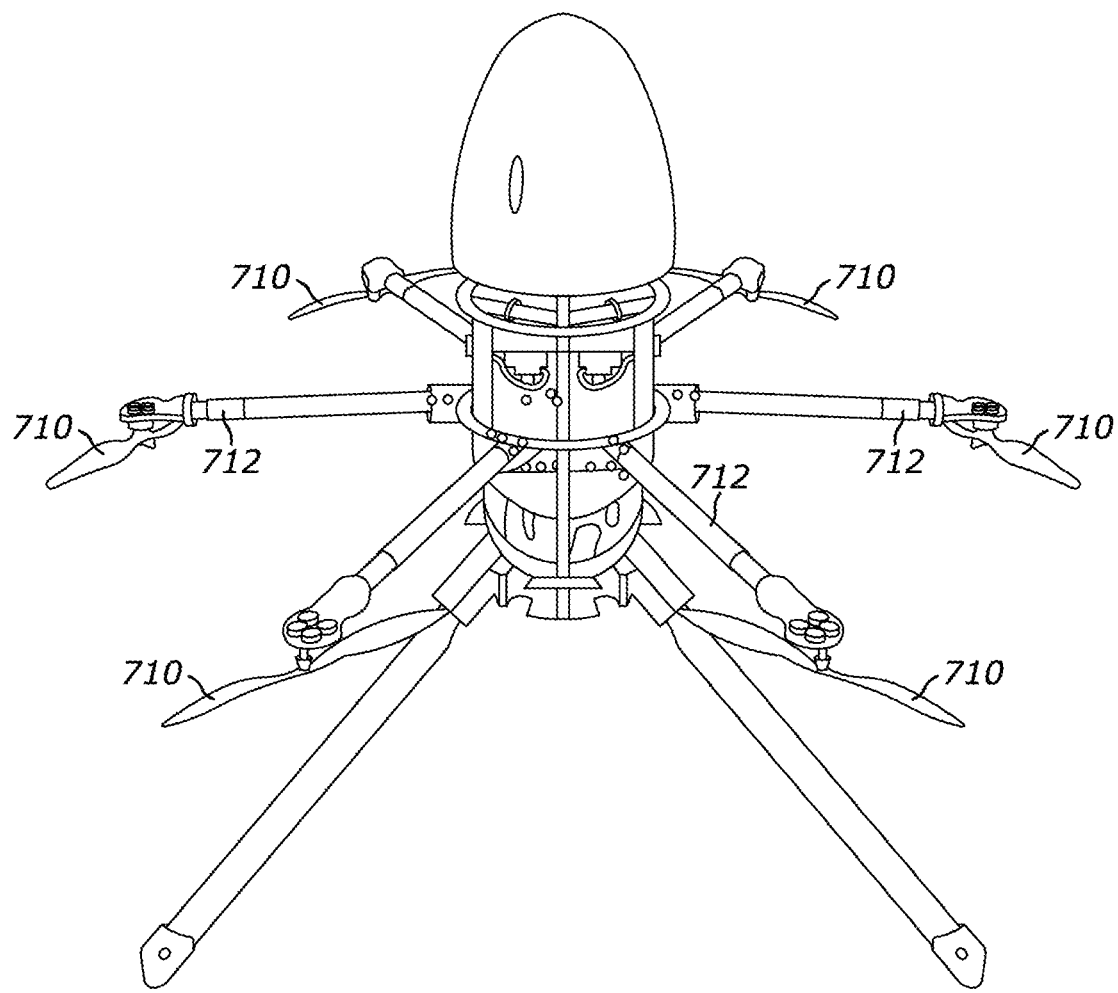
Figure 7C:
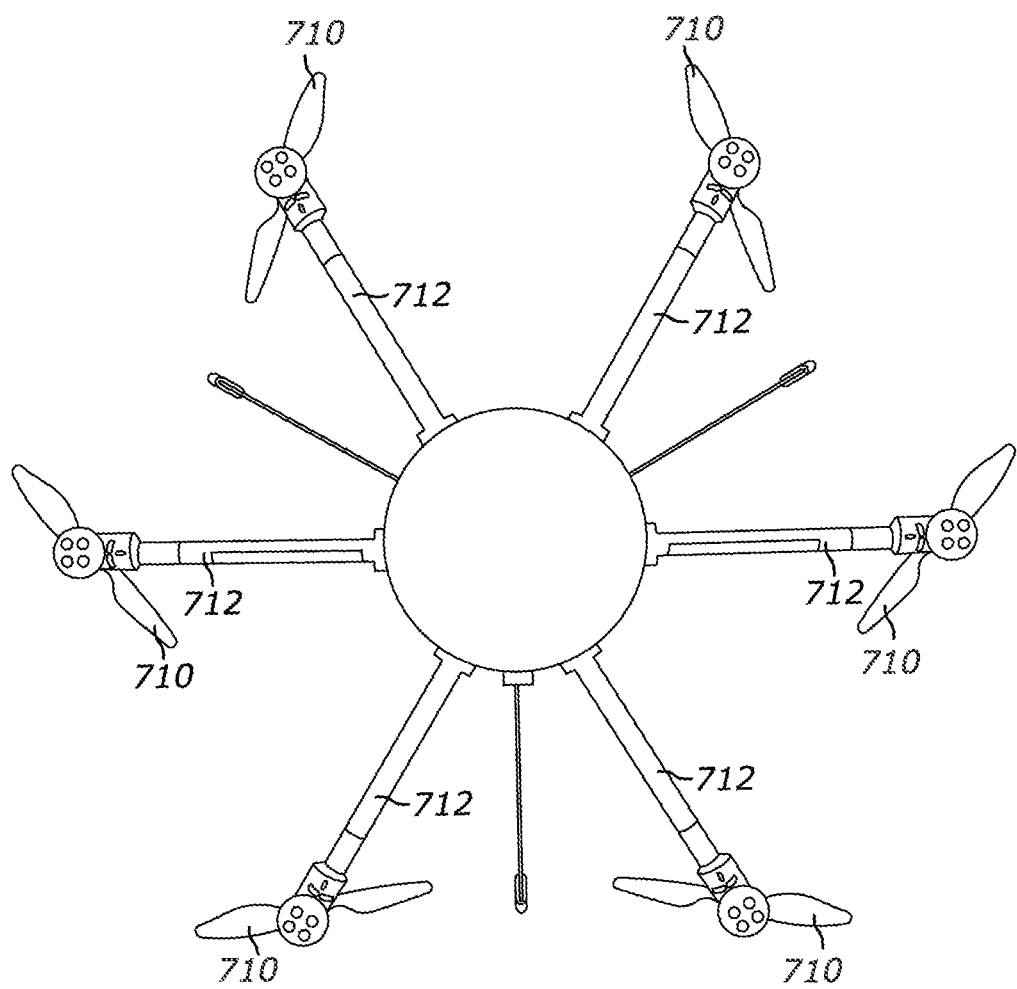

FIGS. 7A-7C illustrate a vehicle configuration in folded and deployed states. More specifically, FIGS. 7A-7C illustrate the vehicle partially inside the launcher tube and interfacing with the carriage (FIG. 7A), and with its arms and fins fully deployed from a side view (FIG. 7B), and a top perspective (FIG. 7C). Some of the components called out in the description of FIG. 6 above are also depicted in in FIG. 7A (e.g., the nosecone 604 [coupled to the central body frame] with the battery 602 inside and the onboard computer 614). In addition, FIG. 7A illustrates the motion capture IR marker 702, the spring-loaded hinge 704, the carriage assembly 706, and the polycarbonate launch tube 708.

Tables 3 and 4 provide a list of the key components and main design attributes that may be used in accordance with one or more embodiments of the invention.

TABLE 3

System Properties

| Property | Value | Units |
|---|---|---|
| Mass | 3.3 | kg |
| Length | 79 | cm |
| Folded Diameter | 15 | cm |
| Unfolded Diameter (propeller tip-to-tip) | 58 | cm |
| Thrust at hover | 56 | % |
| Launch speed | 12 | m/s |

TABLE 4

Key Squid Components

| Component | Description | Mass (g) |
|---|---|---|
| Flight Electronics | | |
| Motors | T-Motor F80 Pro, 1900 kv | 36 (×6) |
| ESCs | T-Motor F30A 2-4S | 6 (×6) |
| Propellers | 7" diameter × 4" pitch | 8 (×6) |
| Flight Controller | mRo PixRacer (PX4 Flight Stack) | 11 |
| Receiver | X8R 8-Channel | 17 |
| Telemetry | HolyBro 100 mW, 915 MHz | 28 |
| Battery | 4 s LiPo, 6000 mAh, 50 C. | 580 |
| Perception System | | |
| Onboard Computer | NVIDIA TX2 | 144 |
| Carrier Board | Orbitty Carrier Board | 41 |
| Rangefinder | TeraRanger Evo 60 mm | 9 |
| IMU/Barometer | VectorNav VN-100 | 4 |
| Camera | FLIR Chameleon3 w/3.5 mm lens | 128 |

Central Rigid Body

In contrast to conventional multirotors, SQUID's central body (also referred to as central body frame) must sustain high transient forces during ballistic launch. Unlike the first embodiment described above, which was manually stabilized by a pilot, vehicle embodiment 2 also requires a perception system comprising a camera 632 (e.g., FLIR CHAMELEON3), rangefinder 634 (e.g., TERARANGER EVO 60 m), IMU/barometer 636 (e.g., VECTORNAV VN-100), and onboard computer 614 (e.g., NVIDIA JETSON TX2) to achieve full autonomous stabilization. Due to these added components, the original 3D-printed aeroshell structure of the first embodiment may be abandoned in favor of a hollow carbon fiber frame in order to maximize volume, increase strength, and allow easy access to the perception and control systems.

The frame consists of multiple plates (e.g., six thick carbon fiber plates) separated by support columns (e.g., made of aluminum standoff pins surrounded by carbon fiber tubes) that transmit the launch loads (e.g., via the central rigid body). A 3D printed nosecone (coupled to the central body frame) reduces drag by approximately 50% compared to a bluff body nose. The placement of the heavy LiPo battery in the nosecone 604 shifts the center of mass (COM) upward. This placement ensures that SQUID's aerodynamic center (AC) trails behind the COM, which improves the passive ballistic stabilization. Passive stabilization is further addressed below.

Rotor Arms

Referring to FIGS. 7B and 7C, the rotors 710 are mounted on carbon fiber tubes 712 which attach to the central body with passive, spring-loaded hinges to allow 90° of rotation (or within a threshold range of 90°). In this regard, the rotors 710 are mounted to each of the foldable arms 712 with the rotors 710 controlled by a motor (e.g., each rotor 710 may have a respective motor) to enable flight of the vehicle. The arms 712 can exist in two states: constrained by the launch tube 708 to be parallel to the central body axis (of the central body frame)(closed) (as illustrated in FIG. 7A), or extending radially outward perpendicular to the central body axis (open) (as illustrated in FIGS. 7B and 7C). The foldable arms transition from the closed state to the open state subsequent to launch. For the first vehicle embodiments described above, the timing of the transition was controlled by an arm release mechanism (e.g., the nichorome wire 302 and monofilament line 304 of FIG. 3). In the second vehicle embodiments, however, the transition from closed to open state may occur immediately after the multirotor vehicle leaves the launch tube 708, reducing mechanical complexity.

Figure 7D:
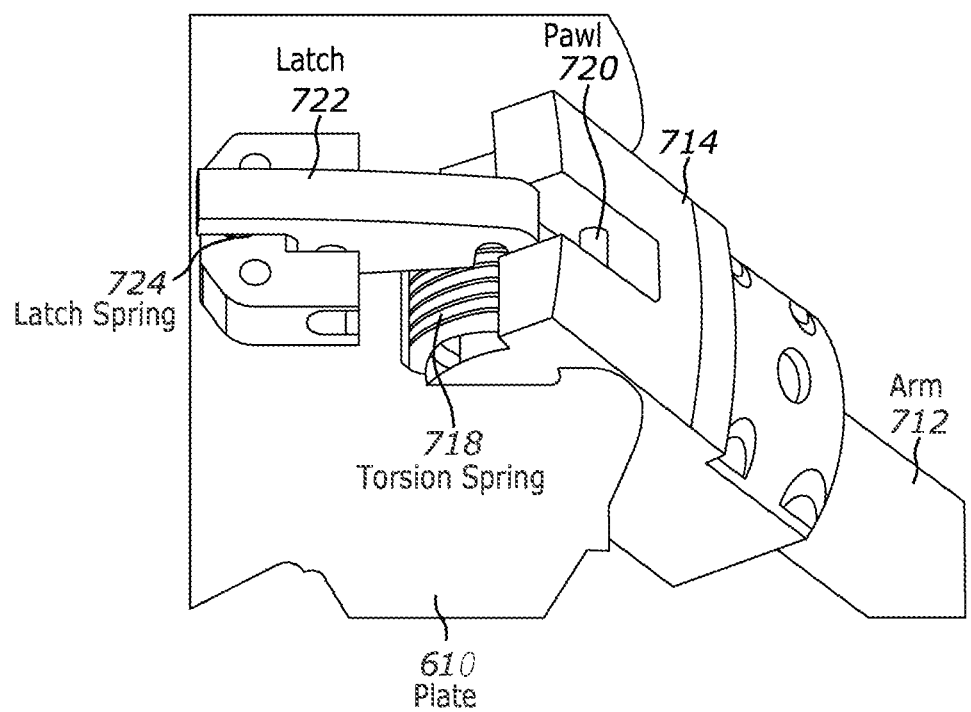
FIG. 7D illustrates a zoomed-in view of the rotor arm hinge joint with a spring-loaded latching mechanism in accordance with one or more embodiments of the invention.

FIG. 7D illustrates a zoom-in view of the rotor arm hinge joint with a spring-loaded latching mechanism in accordance with one or more embodiments of the invention. As illustrated, the hinge 714 is attached to the arm 712 and a plate 610 of the central body. The torsion spring 718 is constrained by the launch tube 708 in the closed state and causes the arms to unfold when transitioning to the open state. A pawl 720 may enable the arms to open in one direction. The torsional spring 718 inside the hinge 714 may generate 1.04 Nm of torque when the arm 712 is closed, and half that amount when the arm 712 is open. Vibration in the motor arms 712 during flight dictates the addition of a spring-loaded latch (consisting of the latch 722 and latch spring 724) to keep the arms 712 rigidly open after deployment/transitioning to the open state. Accordingly, within the launch tube 708, the foldable arms 712 exist in the closed state by being constrained by the launch tube 708, and the arms 712 transition to the open state immediately after the vehicle leaves the launch tube 708 via the torsional spring 718 inside the hinge 714. However, as described herein, alternative embodiments may not utilize/require the latch 722 and latch spring 724.

Fins

Returning to FIG. 6, fins 626 provide aerodynamic stabilization during ballistic flight to ensure the vehicle maintains the launch direction before active stabilization is engaged. Aerodynamic forces on the fins 626 shift the multirotor's AC (aerodynamic center) downward behind the COM (center of mass/center of gravity CG), enabling the vehicle to passively weathercock and align with the direction of flight. Folding fins 626, rather than fixed fins, are a design change between the first vehicle embodiment and the second vehicle embodiment. and were driven by a compromise between competing requirements of aerodynamic stability, low drag, constrained tube volume, and design simplicity. This design change was guided by the use of literature-derived expressions [14] and scale model testing.

Fixed fins have a number of disadvantages. Any fin requires clean, unseparated flow to operate as designed. Therefore, fins that remain fixed within the tube 708 area must also be paired with a streamlined tailbox in order to have access to said flow. This tailbox streamlining however reduces the wake drag and hence also reduces the stabilizing force it provides. Additionally, small fins which fit within the tube 708 can only be partially effective as they have a limited wingspan. Expanding the fins along the tube only further lowers their aspect ratio (and therefore lift coefficient), reducing their capacity to move the AC. Deploying fins radially is therefore a much more effective means of enhancing stability, improving the vehicle's ability to predictably rotate upwind.

The second vehicle embodiment's tubular cross section and foldout fins 626 increase stability relative to the first vehicle embodiment and simplify launch packaging issues with a simple cylindrical geometry, but do so at the cost of more ballistic drag. For most applications however, ballistic efficiency can be sacrificed for these gains. Foldout fins 626 can be tailored to provide a desired stability margin between the COM and AC, and provides margin for swappable payloads that may shift the COM. Given selected 30 cm fins 626, the AC is located 38 cm from the nose 604, with a margin of 14 cm from the COM. Uncertainties in aerodynamic coefficients, drag on the arms, and the dynamics of the unfolding components can lead to substantial deviations from this calculated margin however. Accordingly, aerodynamic stability was validated with a 3:1 scale model (50 mm diameter, 150 grams) using an open air wind tunnel prior to full-scale tests.

While the hinges connecting the fins 626 to the body are similar to the arm hinges, the fins 626 may not use a latching mechanism because vertical vibrations have little impact on their functionality. "Feet" attached to the ends of the fins protect the tips and enable them to double as landing gear 628.

In view of the above, the fins may be fixed onto the frame and consist of (1) a ring-fin and/or rigid fin, or may be (2) folding fins with feet.

Ballistic Launch Process and the Autonomous Transition to Stabilized Flight

Figure 8:
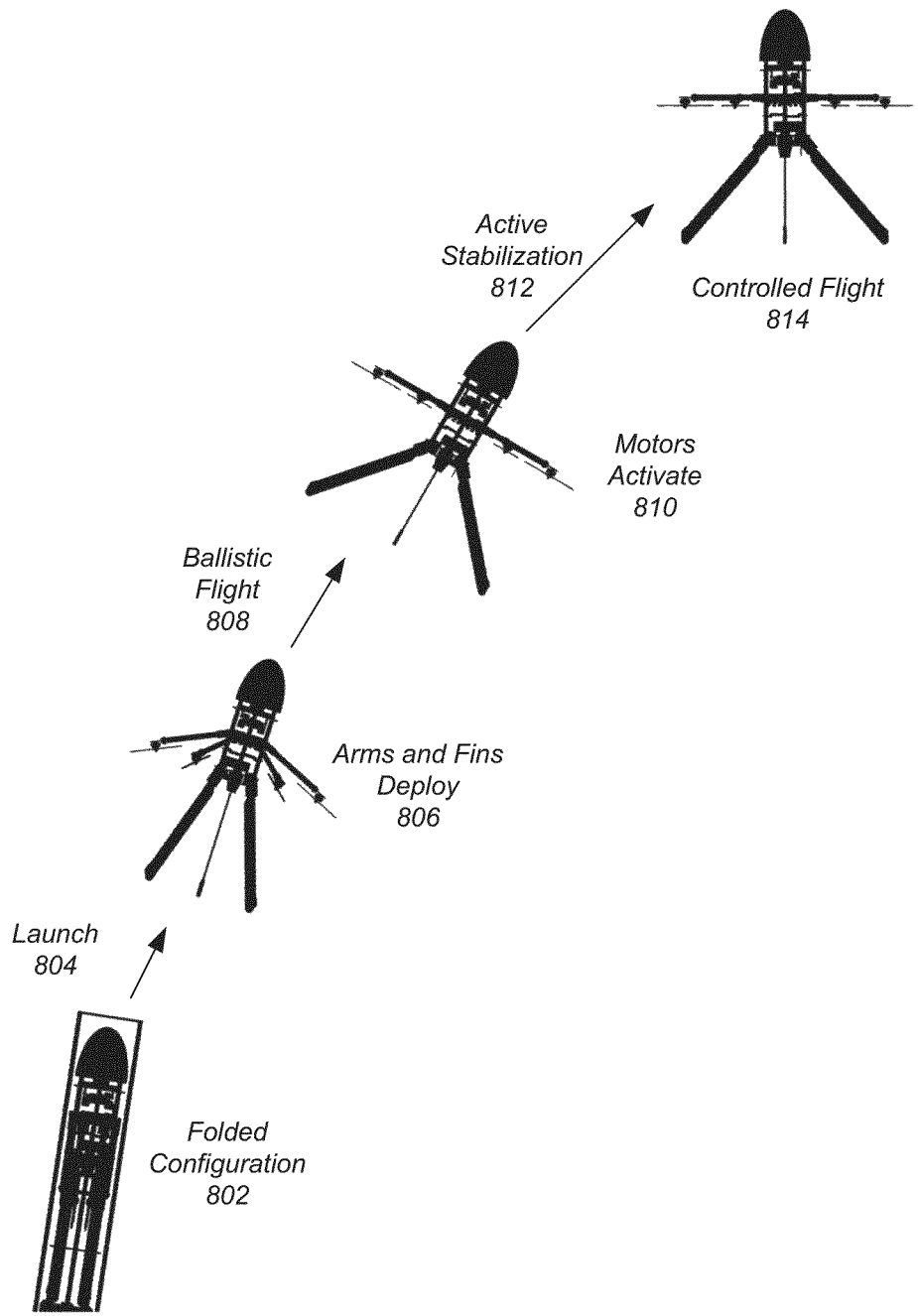
FIG. 8 illustrates a deployment sequence of a vehicle in accordance with one or more embodiments of the invention.

SQUID's mechanical design and onboard active controls manage the deployment sequence illustrated in FIG. 8. The deployment sequence consists of the folded configuration 802 prior to launch 804, after which the arms and fins deploy 806 for ballistic flight 808, after which the motors activate 810 towards achieving active stabilization 812 and eventual controlled flight 814.

The deployment pipeline comprises two primary phases: passive stabilization and active stabilization 812. In the first phase, the multirotor's aerodynamic design ensures attitude stability as it travels along a ballistic trajectory after launch 814. Active stabilization 812 begins once the arms are fully deployed and occurs before the trajectory's apogee. The following sections provide details on the launch stabilization process and experimental validation of these concepts.

Ballistic Launch Process

SQUID is ballistically launched to a minimum height that depends on both the safety requirements of the assets near the launch site and the altitude required for the targeted investigation. All the energy needed to loft the multirotor to the desired height, as well as to overcome the drag of the passive stabilization process, must be generated over the launching tube's 708 very short length. Consequently, the airframe experiences very large acceleration forces while being launched. Even after leaving the tube 708, the effects of post-launch vibrations can continue to play havoc on the onboard attitude estimator.

The launch mechanism may consist of a variety of different mechanisms (e.g., a tube launching device, a slingshot type of device, a structural device without a surrounding tube structure (e.g., a launch pad with stabilizing structures to guide the launch direction), etc.). In an exemplary embodiment, the launch mechanism may consist of a re-purposed T-shirt cannon [21]. Pressure may be supplied by a liquid $CO_2$ canister that is regulated between 5.5 bar (indoor, to stay within ceiling clearance) and 6.9 bar (outdoor, maximum safe) chamber pressure in gas phase. An aluminum stand holds the launch tube in place and allows adjustment of the launch angle. Accordingly, both the launch height and angle can be adjusted to avoid local hazards.

The maximum height achieved with a t-shirt cannon launch mechanism system was 32 m (or 1 kJ potential energy), but the potential energy seen by the multirotor is generally less than a third of the ideal adiabatic expansion of the $CO_2$ chamber (likely due to limited valve throughput, friction losses within the tube, and air drag).

Prior to launch, SQUID rests in a folded state/configuration 802 inside the launch tube 708, which is generally pointed upwards. A 300 gram carriage assembly 706 sits between SQUID and the tube base, transmitting launch loads generated by the compressed gas directly to the frame's support columns 606. A 25 mm-thick polyethylene foam disk 726 at the base of the carriage 706 creates a low-friction seal which maximizes the transfer of energy from the compressed gas into kinetic energy and also prevents the carriage 706 from leaving the tube 708 during launch 804.

This launching mechanism meets requirements, but has a number of inefficiencies. After launch 804 is triggered, the compressed gas accelerates SQUID through the tube 708 at approximately 21 g's (estimated from video as the IMU saturates at 16 g's), but short of the unlimited valve throughput prediction of ~350 g's. Discrepancies between the predicted and estimated values are thought to be from friction within the tube, a valve throughput, and air drag.

Passive Stabilization—Launch Without Wind

After exiting the launch tube 708, the arms 616 and fins 626 deploy 806 immediately due to the spring-loaded hinges. This deployment 806 has four effects on the aerodynamic stability: the COM is shifted towards the nose 604, the AC is shifted rearward due to the fin lift, the fins 626 increase aerodynamic damping in yaw, and mass moves outwards which increases yaw inertia.

As described above, the lower AC helps SQUID maintain orientation and follow the intended flight path until active stabilization 812 begins. The large displacement between the COM and AC, coupled with the launch momentum, causes SQUID to orient robustly into the apparent wind. When the launch tube 708 is stationary and roughly vertical, this effect helps SQUID to passively maintain orientation during the ballistic phase 808, which simplifies the transition to active stabilization 812.

Passive Stabilization—Launch in Crosswind

During launch from a moving vehicle, SQUID experiences a strong crosswind, and will weathercock its nose in the direction of the launch platform's motion. Accordingly, SQUID's passive stabilization design ensures that the multirotor 600 travels smoothly during the ballistic phase 808 and that its orientation at the beginning of the active stabilization phase 812 is predictable.

To validate SQUID's expected passive aerodynamic behavior before field testing, sub-scale wind tunnel tests were performed at the Center for Autonomous Systems and Technologies (CAST) at Caltech. These tests were intended to prove that the new folding fin architecture could provide a sufficient stabilizing effect in the presence of a crosswind.

The sub-scale wind tunnel tests were performed using a ⅓ scale model of the second embodiment. Scaling for ballistically-launched drones near apogee, discussed above, primarily depends upon the Froude number (U/√gL), launch- to wind-velocity ratio, geometric parameters, and launch angle. Since the second embodiment's tailbox is a bluff-body disc, separation at the base is virtually guaranteed, meaning Reynolds effects can be neglected [14]. To correct the sub-scale results to be representative of the full-scale model, the trajectories and velocities were scaled by a factor of 3 and √3, respectively.

Accordingly, the performance of a vertical launch of 4.5 m/s in 10 m/s crosswinds can be extrapolated to the behavior of a full-sized drone launched at 7.8 m/s in a 17 m/s crosswind. The aerodynamically stable behavior, as indicated by the upwind turn, illustrates that the multirotor 600 with deployed fins 626 and motor arms 616 produces a sufficient righting moment to predictably orient the multirotor 600 upwind on launch 804. While not perfectly analogous (full-scale tests were performed at 12 m/s and a slightly different geometry), these sub-scale trajectories had a similar one-third scaled stability margin (5 cm) and provided confidence that the full-sized second embodiment would have a predictable trajectory if launched from a moving vehicle.

Transition from Passive to Active Stabilization

SQUID commences the autonomy pipeline once the distance sensor indicates the vehicle 600 has cleared the launch tube 708. The passive-to-active transition occurs after the vehicle 600 has exited the tube 708 and the arms 616 are fully deployed, allowing the motors 618 to spin. Starting the motors 618 early in the ballistic phase 808 of launch is important as the motors 618 need to be fully spooled up and stabilizing the multirotor 600 before apogee. At apogee, the airspeed may not be sufficient to provide enough aerodynamic stabilization, risking the multirotor 600 entering a tumbling state from which it may not recover.

Active Stabilization 812

Figure 9:
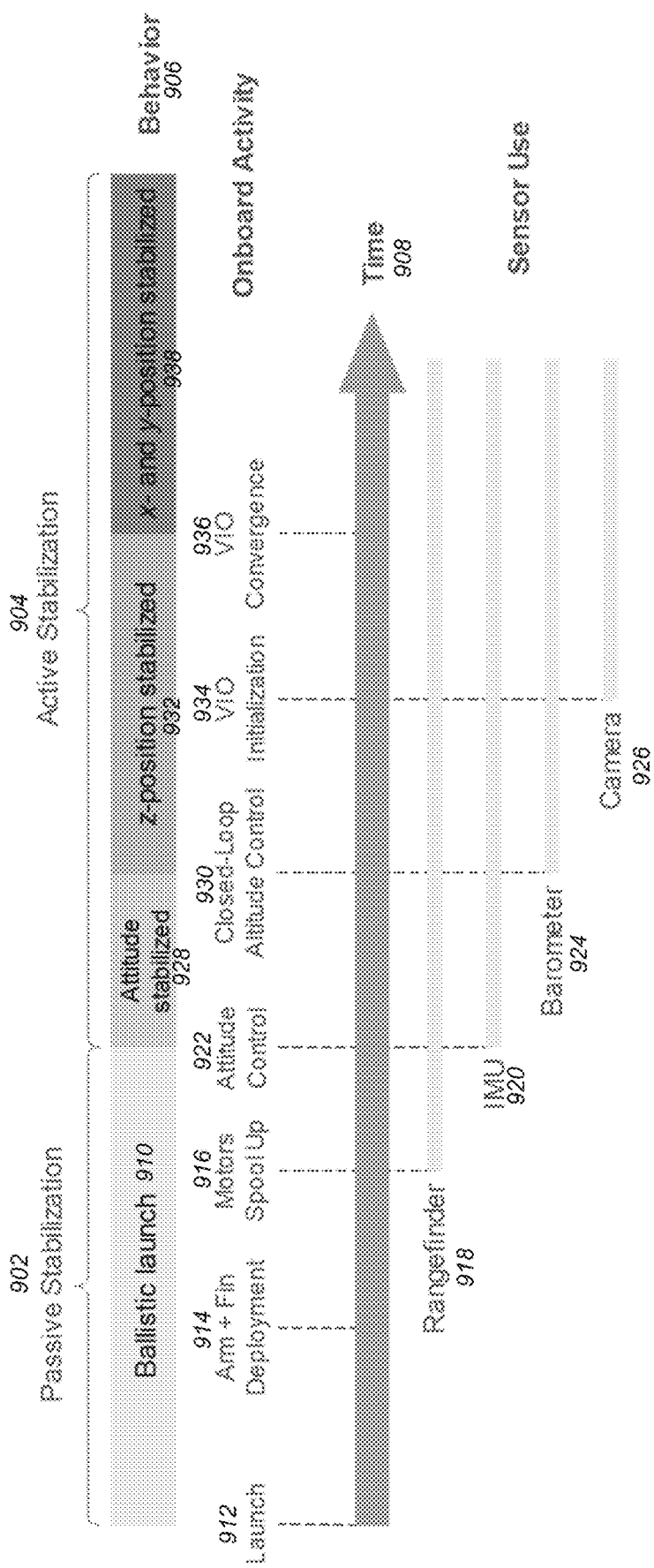
FIG. 9 shows at which point in the launch trajectory different sensors become online, and what control mode (orientation-only or full position) is possible in accordance with one or more embodiments of the invention.

As the vehicle is passively stable, it will not tumble during the first few seconds when sensor measurements are unreliable (due to G-loads of the tube launch). Later, once the sensors are reliable, the vehicle can smoothly transition to onboard autonomy and control. FIG. 9 shows at which point in the launch trajectory different sensors become online, and what control mode (orientation-only or full position) is possible in accordance with one or more embodiments of the invention. It may be noted that the active stabilization may be achieved via software executing via an onboard computer. Such software may be programmed utilizing an open source software/software stack to achieve the aircraft active stabilization.

As described herein, the vehicle transitions from passive stabilization 1102 to active stabilization 1104. More specifically, as described above, passive stabilization 902 is achieved/maintained during ballistic launch 910. The vehicle is launched at 912 and the arm and fins are deployed at 914. As described above, such passive stability 902 may be achieved based on a streamlined vehicle (e.g., the shape of the nosecone), a center of gravity as high up as possible (e.g., with the battery placed in the nosecone), and the use of fins. During the ballistic launch phase 910, the motors are spooled up 916, and the rangefinder sensor 912 (e.g., a laser range of sight sensor) may be enabled to track altitude/distance/etc.

The active stabilization 904 solution is based upon previous research into autonomously recovering a monocular vision-based quadrotor after its state-estimator fails due to a loss of visual tracking [18] [22]. For a visual inertial odometry pipeline, the following may be utilized: the open-source Robust Visual Inertial Odometry (ROVIO), and an extended Kalman Filter that tracks both 3D landmarks and image patch features [23]. Since it tightly integrates image intensity information with inertial data to produce odometry estimates, ROVIO is capable of operating in stark, low-texture environments such as over pavement, water, and the surface of other planets.

Returning to FIG. 9, FIG. 9 illustrates the behavior 906 (e.g., within the launch trajectory) during the passive stabilization 902 and active stabilization 904 stages/phases over time 908.

The rangefinder 918 autonomously triggers active stabilization 904 that is controlled by an onboard computer that receives input from the sensors 918-926. The first stage of the active stabilization phase 904 controls the attitude to a nominal zero-roll/pitch orientation using the IMU (Inertial Measurement Unit) 920—based attitude estimate. As the air pressure around the multirotor spikes on launch 912, the barometric 924 altitude estimates become unreliable and the altitude must be maintained open-loop, biased upwards for safety. In other words, once the vibrations from launch 912 settles down, the IMU sensor 920 may be used to measure the vehicle's characteristics (e.g., force, angular rate, orientation, attitude, etc.) and the onboard activity of attitude control 922 begins. During the active stabilization phase 904, various sensors including the rangefinder 918, IMU 920, barometer 924, and camera 926 may be used to perform the active stabilization 904. More specifically, the onboard activity of attitude control 922 uses the rangefinder 918 and IMU 920 to stabilize the attitude 928 (i.e., the onboard computer provides attitude control to stabilize the attitude 928 based on the input from the IMU 920).

The barometric 924 readings stabilize within three seconds of launch, and at this point, SQUID begins actively controlling its altitude and attempts to reduce the vertical velocity to zero (i.e., to stabilize the z-position 932). In other words, the onboard computer provides closed-loop altitude control 930 to stabilize the z-position 932 of the vehicle based on input from the rangefinder 918 (or separate barometer 924). In this regard, with sufficient data from a rangefinder, the range from the ground could be used without the need for a barometer. As no horizontal position or velocity information is available, active control of the lateral position (i.e., x and y position) is not possible and SQUID continues to drift in plane until the VIO (visual inertial odometry) can be initialized at 934.

Several conditions need to be met before the VIO can be successfully initialized 934. Firstly, the pitch and roll rates need to be near-zero (i.e., below a pitch roll threshold) to ensure that the camera 926 captures frames with low motion blur. Secondly, the vertical velocity (z-position) needs to be near-zero (i.e., below a vertical velocity threshold) so the distance between the multirotor and the ground remains constant and the initial feature depth can be well established using rangefinder 918 measurements. Finally, the lateral velocity (x and y positions) must be small (i.e., below a lateral velocity threshold) (once again to minimize motion blur), so the multirotor is allowed to drift for 10 s post spool up to enable aerodynamic drag to bleed off excess speed. Alternative embodiments of the autonomy pipeline may sense when to initialize VIO directly from the detected motion blur (e.g., using camera 926), enabling the vehicle to enter position stabilization sooner after launch.

The VIO is considered initialized 934 when the cumulative variance of the VIO's x- and y-position estimates drop below a preset threshold (i.e., there is VIO convergence 936, and the x- and y-positions are stabilized at 938). The pose estimates are then fed into the flight controller state estimator filter to be fused with the IMU 920. In other words, the onboard computer provides VIO initialization and VIO convergence to stabilize an x-position and y-position of the vehicle based on input from the camera.

At this point, SQUID has full onboard state estimation and can now control both altitude and lateral position.

Experimental Validation

To demonstrate the proposed passive-to-active stabilization pipeline, a SQUID was launched in a 42 foot-tall flying arena at CAST. The arena has two tiers of OPTITRACK motion capture cameras allowing SQUID's position and orientation to be tracked throughout the duration of a flight for offline analysis. During initial development, a tether system was constructed inside the arena to prevent the multirotor from damaging the facility in the event of a launch failure. A small weight was used to passively eliminate any slack in the tether. As SQUID accelerates significantly faster than the 1 g of the counterweight (e.g., as observed due to the slack in the tether), it is unlikely that the tether interfered with the critical passive-to-active attitude stabilization phase.

Figure 10:
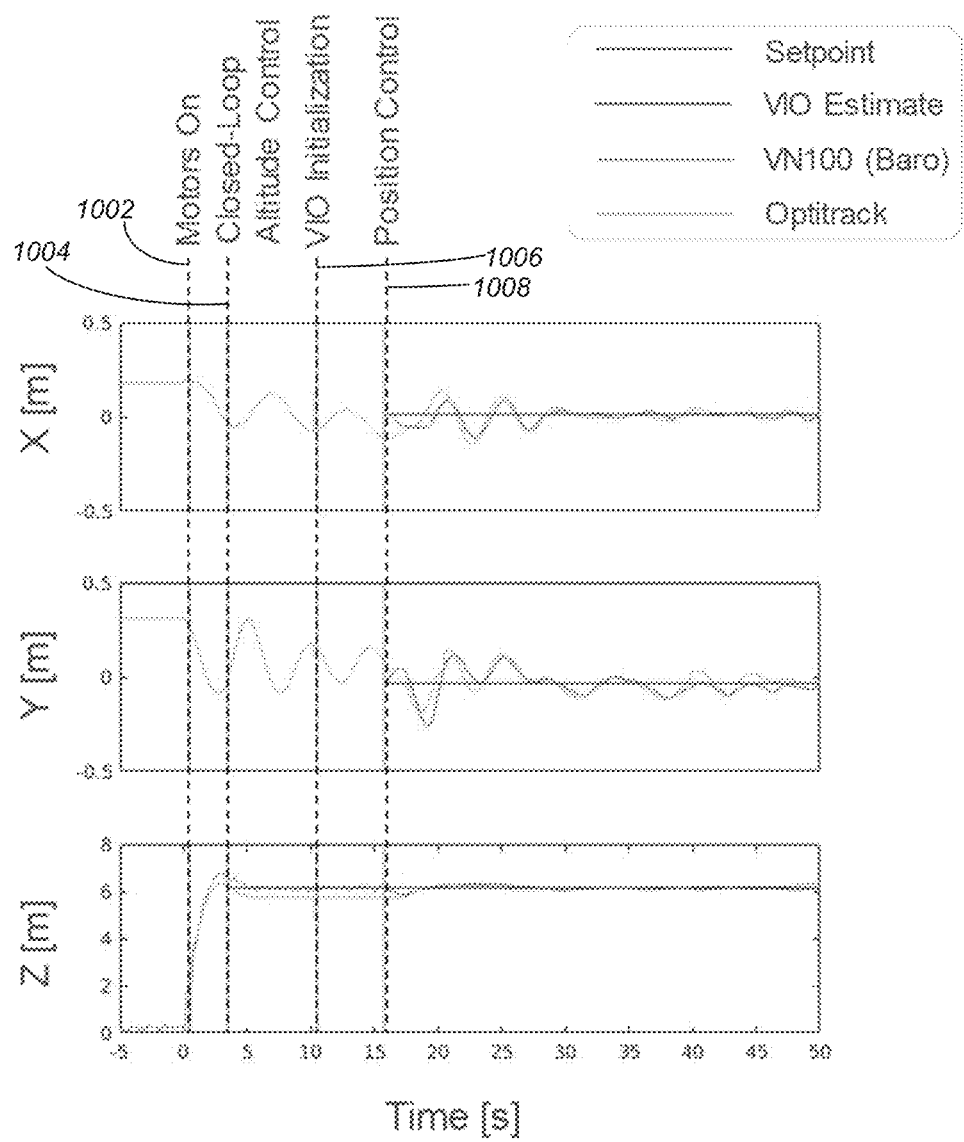
FIG. 10 shows the position tracking of a full launch to active position stabilization test flight in accordance with one or more embodiments of the invention.

FIG. 10 shows the position tracking of a full launch to active position stabilization test flight in accordance with one or more embodiments of the invention. At launch (t=0), altitude is quickly gained as the multirotor accelerates. The motors turn on at Point 1002 and begin actively stabilizing the attitude. By Point 1004, the barometer has recovered from the launch and closed-loop altitude control commences. Ten seconds after the motors are turned on (Point 1006), VIO initialization 934 begins. At Point 1008, the VIO is initialized and starts to feed pose estimates to the flight controller, which then actively controls the position of the multirotor, completing the pipeline (i.e., VIO convergence 936). The pipeline was successfully demonstrated across several days, lighting conditions, and launch pressures.

Alternative Embodiments and Advantages

Figure 11C:
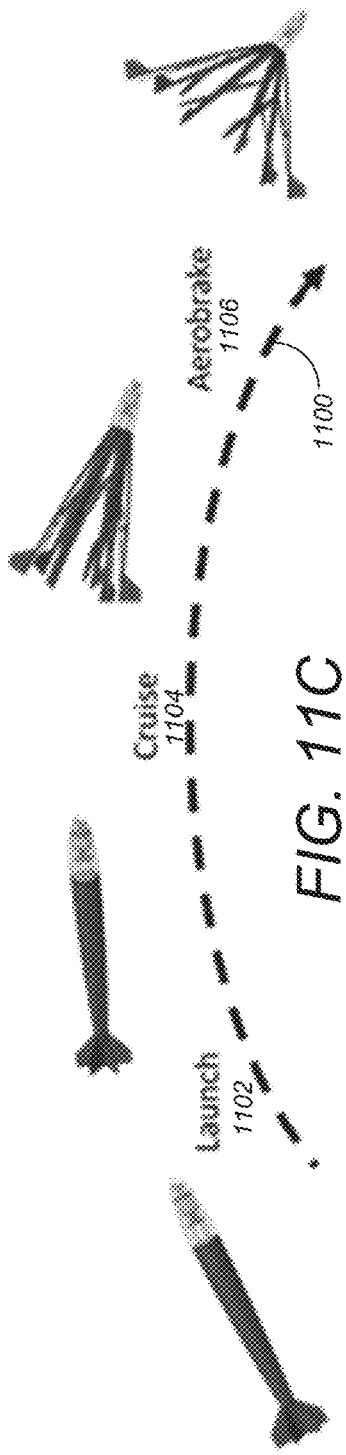
FIGS. 11A-11C illustrate further alternative embodiments of the launch form (FIG. 11A) and UAV form (FIG. 11B) through the flight trajectory (FIG. 11C) that may be provided in accordance with embodiments of the invention.
Figure 11B:
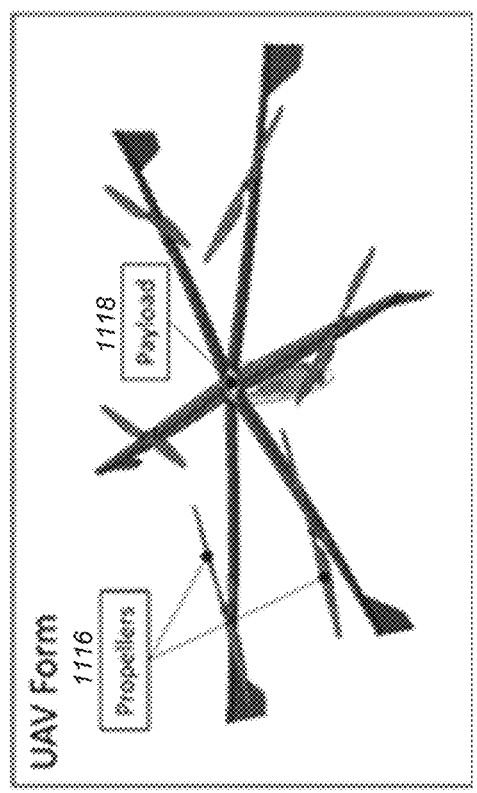
Figure 11A:
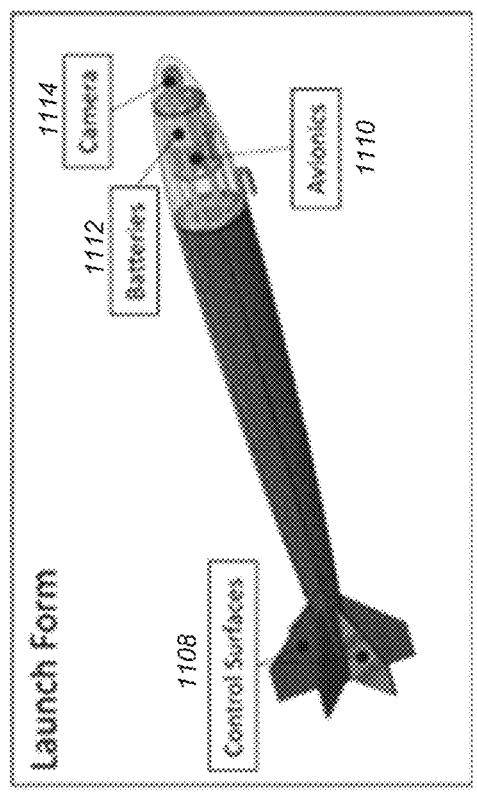

While several embodiments have been described above, the invention is not restricted to any such embodiments. For example, embodiments (as described above and herein) may include a ballistic phase of low-altitude flight over a populated area (so fold-out architecture should avoid dropping discarded mass whenever possible). Embodiments further include an aerodynamic projectile that cruises a required distance, aerobrakes, and then begins powered multi-rotor flight without ever landing. FIGS. 11A-11C illustrate further alternative embodiments of the launch form (FIG. 11A) and UAV form (FIG. 11B) through the flight trajectory (FIG. 11C) that may be utilized in accordance with embodiments of the invention. The flight trajectory 1100 of the SQUID consists of several phases.

Launch 1102: The SQUID is kinetically launched at high speed, either to obtain a large altitude or horizontal displacement.

Cruise 1104: The rear stabilizers and fore center-of-mass maintain stability. This cruise stage 1104 can be either entirely passive, or small adjustments to the center-of-mass can trim the trajectory.

Aerobrake 1106: The tail of the SQUID splits such that sections of the rear aeroshell move normal to the airflow. Stability is maintained by the fore center-of-mass, similar to a badminton shuttlecock.

UAV: The aeroshell sections also act as rotor mounts, revealing a stable multirotor aircraft that completes the deceleration and delivers the required payload.

FIG. 11A illustrates the launch form of SQUID. The forward section of the projectile consists of the avionics 1110, battery 1112, and camera 1114 mounted inside a nosecone, while the aft section contains the rotor arms and rotors compacted inside a spring-loaded aeroshell with stabilizer fins/control surfaces 1108. In other words, the battery 1112 may be located in the upper vertical location of the vehicle to position a center of mass of the vehicle to provide aerodynamic stability during a launch. Further, the fins are attached to the central body frame where aerodynamic forces on the fins shift an aerodynamic center (AC) of the vehicle downward below the center of mass of the vehicle. The aeroshell opens to slow down the vehicle after cruise 1104, and the rotors are activated once the vehicle has reaches a suitably slow airspeed. Thus, once the flight trajectory has reached the UAV stage, FIG. 11B illustrates the UAV form of the SQUID with the propellers 1116 unfolded and payload 1118 intact. Parameters for such a device may include:

Mass Allocation: 10 kg total, 5 kg empty airframe, 2 kg battery, 3 kg payload

Launch: 150 m/s exit, 1500 Ns impulse, 15° launch angle

Cruise: 1 km range, 1 m long aeroshell, 8:1 fineness ratio

Aerobrake: 75 m braking distance, 0.5 $m^2$ frontal area

UAV: 20 min dwell time, 1 m diagonal, 2:1 thrust/weight ratio, 5 m/s

Figure 11D:
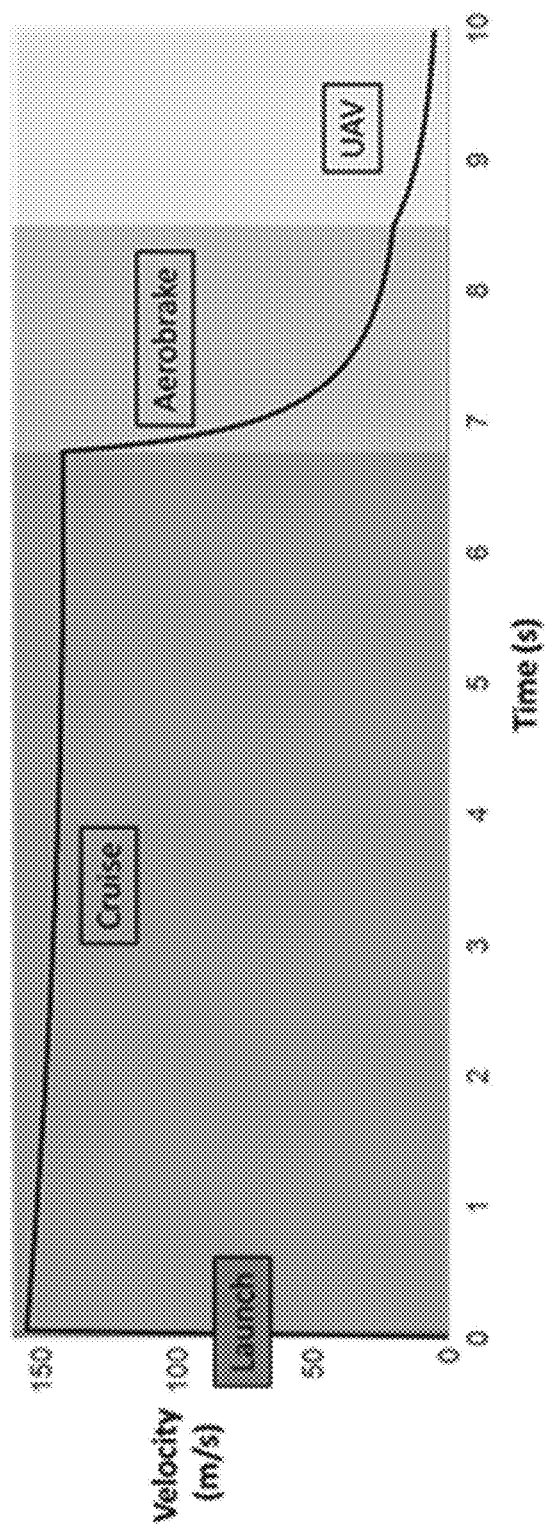
FIG. 11D illustrates a plot of exemplary vehicle performance for the SQUID of FIGS. 11A-11B in accordance with one or more embodiments of the invention.

FIG. 11D illustrates a plot of exemplary vehicle performance for the SQUID of FIGS. 11A-11B. The plot reflects a range of 1 km, covering the horizontal distance in 10 seconds given a 150 m/s launch, cruise phase of about 6.8 s, aerobrake phase of ~1.6 s, and UAV phase of ~1.5 s.

Use Case Overview

The advantages of the SQUID architecture include significant shared mass between the different flight phases, thereby decreasing the airframe mass and increasing the mass allotment for payload. Referring again to FIGS. 11A-11C, the flight battery 1112 doubles as a forward center-of-mass during cruise 1104, the rotor arms double as stabilizer mounts, and the cruise aeroshell doubles as the aerobraking surface. Further, it may be noted that a large distance and velocity is attainable by the drone without expending its own battery power. In this regard, unlike a similarly sized multirotor, the SQUID can be quickly launched to where it is needed, then return autonomously at a slower speed. This type of high velocity and efficient flight is generally considered the regime for fixed-wing aerial vehicles, but the SQUID can perform in this space while retaining the maneuverability of a multirotor.

In addition to the above, the SQUID need not be projectile-launched, but could instead be dropped from altitude in streamlined form. Many of the solar system bodies include an atmosphere, and a rotorcraft that can be deployed autonomously and without ground contact opens intriguing possibilities for delivering a scientific payload. For example, the current Mars Helicopter is designed to be launched from the rover after landing. SQUID could allow a rotorcraft to instead be deployed during EDL (entry, descent, and landing), improving the safety of the surface rover by increasing its distance from the high-velocity rotor blades of the helicopter. In addition, the thick atmosphere on Titan, combined with low surface gravity, makes rotorcraft an efficient means of bringing a scientific payload to many successive surface locations. The SQUID concept allows these rotorcraft to be delivered, without landing, during atmospheric entry. One example mission architecture could be a fleet of SQUID aircraft deployed one by one from a large probe, combined with an orbital spacecraft that acts as a communication relay and radar mapper.

In addition to non-Earth based missions, SQUID may be utilized on Earth. For example, a SQUID probe may be dropped from a larger aircraft, either individually or en-mass, and could be used for deploying a mobile sensor payload. Examples include positioning mobile weather sensor stations, collecting oceanographic data after landing on the water surface, or simply enabling distributed aerial imagery.

Further use cases include use in applications ranging from farmland and structural inspection to consumer platforms for personal video. The SQUID concept allows these multirotor platforms to be either dropped to a location from another aerial vehicle, launched to a high altitude, or cover a long distance without expending the on-board battery power. In agriculture, SQUID multirotors could be automatically launched to altitude, hover to take photos, and then descend under battery power, providing an efficient means of obtaining crop and irrigation status while only draining battery power for the hover and descent. For security, a SQUID multirotor could also be used to investigate intrusions on perimeter of a fixed protected area, rapidly covering the distance from a centralized depot through an automated launch. For consumer products, given the popularity of both drones and model rockets among aerospace hobbyists, SQUID may also be sold to consumers for a variety of purposes. For environmental monitoring, SQUID allows a sensor payload to be launched and returned from places difficult for standard multirotors to fly, such as to high altitudes, into strong headwinds, or rapidly through conditions that would be untenable for slower-flying vehicles. Weather data could be collected at altitude by a SQUID and then returned to recharge, or volcano and geyser ejecta could be flown through and sampled at high velocity with the protective high-speed aeroshell.

Additional embodiments include utilizing the SQUID as a rapid-launched interceptor that is passively stable using at least two different methods—fixed fins and foldout finds. Embodiments may be launched from a moving truck where the passive stability makes it easy to handoff control to onboard autonomy. Such fins may be integrated as a stiff structure to transmit the launch loads or into the landing legs of the rotorcraft. Due to the passive stability, and unlike other tube-launched rotorcraft, SQUID will not tumble and endanger nearby assets even in the case of rotor spin-up failure. The geometry of the fins can also accommodate downward facing sensors. In addition, foldout fins expose a large FOV (field of view) for the bottom of the rotorcraft, allowing cameras and laser altimeters (and other sensors) to easily see the ground (allowing the system to transition control from passive (i.e., aerodynamically stable) to active (using an onboard autonomy system) without ever tumbling.

The following advantages may also be realized:
1) Tube Launch: Tube launch is a predictable separation event for rotorcraft. The launch guarantees there will not be recontact between the rotorcraft and its parent vehicle. This allows a rotorcraft to be deployed during EDL, as the launch can make up the difference between the descent rate to Mars and the ideal flight speed of the rotorcraft.
2) Containerization: Folding rotorcraft are "containerized", meaning they can be packed densely into an aeroshell. By tackling these volume-constraints early, it is easier to infuse many rotorcraft into mission architectures.
3) Multi-agent Missions: Much as cubesats and their standardized launcher are revolutionizing low-earth-orbit, a standardized form factor for rotorcraft could revolutionize Mars exploration. Many rotorcraft could be sent at once using the swarm deployment method.

The passive stability described herein guarantees that the tube launch happens reliably and deterministically, which lowers mission risk. While other types of airframes (coaxial and fixed-wing) exist and have their own advantages (such as long flight time), multirotors have available parts, are field repairable, are mechanically simple, are highly maneuverable, and have widespread pilot adoption.

CONCLUSION

This concludes the description of the preferred embodiments of the invention. SQUID has successfully demonstrated the ability to ballistically launch and transition into autonomous onboard control. In particular, embodiments of the invention provides the ability to for:

(1) A 530 g quadcopter (first embodiment) and a 3.3 kg hexacopter (second embodiment) with a payload of an advanced sensor package and mission computer.

(2) An airframe strong enough to carry and transmit launch loads without damaging onboard components.

(3) Passive aerodynamic stability generated by fixed or folding fins that set the necessary preconditions for transition to autonomous flight.

(4) Wind tunnel testing that validates the proposed multirotor design in cross-wind launches.

(5) An autonomy pipeline that carries the platform from launch detection to full 6-degree of freedom stabilization using only onboard sensing (IMU, barometer, rangefinder, and camera) and without the need for GPS.

Additional embodiments include a delayed fin- and arm-release trigger to extend the ballistic range. Further, embodiments of the invention provide for a ballistically-launched multirotor that deploys without human involvement, opening up new applications in fields such as disaster response, defense, and space exploration. For example, the embodiments of the invention provide the ability to deploy directly from a re-entry vehicle during the entry, descent, and landing (EDL) phase of a planetary exploration mission.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[1] Raytheon, "Coyote uas," (2020), Available from www.raytheon.com/capabilities/products/coyote
[2] UVision, "Hero uav," (2020) uvisionuay.com/main-products/.
[3] Leonardo, "Horus—detail—Leonardo," (2020), Available from www.leonardocompany.com/en/all-products.
[4] P. Gnemmi, S. Changey, K. Meder, E. Roussel, C. Rey, C. Steinbach, and C. Berner, "Conception and manufacturing of a projectile-drone hybrid system," *IEEE/ASME Transactions on Mechatronics, vol.* 22, no. 22, pp. 940-951, 2017.

[5] L. Henderson, T. Glaser, and F. Kuester, "Towards bio-inspired structural design of a 3d printable, ballistically deployable, multi-rotor uav," in Aerospace Conference, 2017 IEEE. IEEE, 2017, pp. 1-7.

[6] DJI, "Mavic 2-dji store," (2020) Available from store.dji.com/product/mavic-2.

[7] Parrot, "Drone camera 4 k hdr Anafi," (2020), Available from www.parrot.com/us/drones/anafi.

[8] Powervision, "Poweregg camera drone, fly to the future," (2020), Available from www.powervision.me/en/product/poweregg.

[9] LeveTop, "The foldable & portable drone." (2020). Available from www.ascentaerosystems.com/

[10] A. AeroSystems, "Ascent aerosystems," (2020) Available from www.ascentaerosystems.com/

[11] P. M. Kornatowski, S. Mintchev, and D. Floreano, "An origami-insprited cargo drone," in 2017 *IEEE/RSJ International Conference on Intelligent Robots and Systems (IROS)*, September 2017, pp. 6855-6862.

[12] NASA, "Mars helicopter to fly on nasas next red planet rover mission," May 2018, Available from ww.nasa.gov/press-release/mars-helicopter-to-fly-on-nasa-s-next-red-planet-rover-mission.

[13] The Johns Hopkins University Applied Physics Laboratory, "Mars helicopter to fly on nasas next red planet rover mission," 2018, Available from dragonfly.jhuapl.edu.

[14] S. F. Hoerner, *Fluid-dynamic Drag: practical information on aerodynamic drag and hydrodynamic resistance.* Hoerner Fluid Dynamics, 1958.

[15] L. H. Jorgensen, "Prediction of static aerodynamic characteristics for space-shuttle-like and other bodies at angles of attack from 0 deg to 180 deg," 1973.

[16] G. J. Leishman, *Principles of helicopter aerodynamics with CD extra.* Cambridge university press, 2006.

[17] A. Thurn, S. Huynh, S. Koss, P. Oppenheimer, S. Butcher, J. Schlater, and P. Hagan, "A nichrome burn wire release mechanism for cubesats," *Proceedings of the st Aerospace Mechanisms Symposium*, vol. 41, pp. 16-18, May 2012.

[18] M. Faessler, F. Fontana, C. Forster, and D. Scaramuzza, "Automatic re-initialization and failure recovery for aggressive flight with a monocular vision-based quadrotor," in 2015 *IEEE International Conference on Robotics and Automation (ICRA).* IEEE, 2015, pp. 1722-1729.

[19] D. Falanga, K. Kleber, S. Mitchev, D. Flreano, and D. Scaramuzz, "The foldable drone: A morphing quadrotor that can squeeze and fly," in *IEEE Robotics and Automation Letters,* Vol. 4, No. 2, April 2019, IEEE 2019.

[20] N. Bucki and M. Mueller, "Design and control of a passively morphing quadcopter," in 2019 *International Conference on Robotics and Automation (ICRA).* IEEE, 2019.

[21] tshirtguns.com, "Bleacher reacher mega t-shirt launcher." Available from tshirtgun.com/bleacher_reacher_mega_2014.pdf.

[22] R. Brockers, M. Humenberger, D. Weiss, and L. Matthies, "Towards autonomous navigation of miniature UAV," in *Proceedings of the IEEE Conference on Computer Vision and Pattern Recognition Workshops.* IEEE, 2014.

[23] M. Bloesch, M. Burri, S. Omani, M. Hutter, and R. Siegwart, "Iterated extended Kalman filter based visual-inertial odometry using direct photometric feedback," *The International Journal of Robotics Research*, vol. 36, no. 10, p. 1053-1072, 2017.

What is claimed is:

1. A launched multirotor vehicle, comprising:
(a) a central body frame;
(b) a battery that is located in an upper vertical location of the vehicle to position a center of mass of the vehicle to provide ballistic stability during a launch, wherein the vehicle is configured to be vertically oriented with respect to gravity at launch;
(c) fins attached to the central body frame, wherein the fins are configured such that aerodynamic forces on the fins provide for an aerodynamic center (AC) of the vehicle that is vertically downward below the center of mass of the vehicle;
(d) three or more foldable arms, wherein:
(i) each foldable arm is attached to the central body frame via a hinge;
(ii) the foldable arms exist in two states:
(1) a closed state wherein the foldable arms are parallel to a central body axis of the central body frame; and
(2) an open state wherein the foldable arms extend radially outward perpendicular to the central body axis; and
(iii) the foldable arms transition from the closed state to the open state subsequent to launch; and
(e) a rotor mounted to each of the three or more foldable arms, wherein the rotors are controlled by a motor to enable flight, and wherein each rotor is configured to continuously rotate during flight; and
wherein a configuration of the vehicle is ballistically stable during launch and actively stable during flight.

2. The vehicle of claim 1, wherein:
the central body frame comprises a three-dimensional (3D) printed aeroshell structure.

3. The vehicle of claim 1, wherein:
the central body frame comprises multiple plates that are separated by support columns that transmit a launch load via the central body frame.

4. The vehicle of claim 1, further comprising:
a nosecone coupled to the central body frame, wherein the nosecone comprises a three-dimensional (3D) printed nosecone that reduces drag compared to drag resulting from a bluff body nose.

5. The vehicle of claim 1, wherein:
the fins are fixed onto the central body frame; and
the fins comprise a ring-fin or the fins comprise a rigid fin.

6. The vehicle of claim 1, wherein:
the fins comprise folding fins; and
feet attached to ends of the fins protect tips of the fins and serve as landing gear.

7. The vehicle of claim 1, wherein:
the vehicle is configured to be launched from a launch tube;
the three or more foldable arms exist in the closed state by being constrained by the launch tube; and
the three or more foldable arms transition to the open state immediately after the vehicle leaves the launch tube via a torsional spring inside the hinge.

8. The vehicle of claim 1, wherein:
transitioning to the open state of the foldable arms is controlled by a delay arm release mechanism.

9. The vehicle of claim 8, wherein:
the delay arm release mechanism comprises a nichrome burn-wire trigger that cuts through a restraining loop of monofilament line.

10. The vehicle of claim 1, further comprising:
a spring-loaded latch to keep the three or more foldable arms rigidly open after transitioning to the open state.

11. The vehicle of claim 1, wherein:
the vehicle is configured to launch via a tube-launch into a ballistic trajectory.

12. The vehicle of claim 1, further comprising:
sensors comprising a range finder, an IMU (inertial measurement unit), a barometer, and a camera;
the range finder autonomously triggering active stabilization that is controlled by an onboard computer;
the onboard computer comprising a processor and memory, wherein the onboard computer:
receives input from the sensors;
provides attitude control to stabilize the attitude based on the input from the IMU;
provides closed-loop altitude control to stabilize a z-position of the vehicle based on the input from the range finder; and
provides VIO (visual inertial odometry) initialization, and VIO convergence to stabilize an x-position and a y-position of the vehicle based on the input from the camera.

13. A launched multirotor vehicle, comprising:
(a) a central body frame;
(b) three or more foldable arms, wherein:
  (i) each foldable arm is attached to the central body frame via a hinge;
  (ii) the foldable arms exist in two states:
    (1) a closed state wherein the foldable arms are parallel to a central body axis of the central body frame; and
    (2) an open state wherein the foldable arms extend radially outward perpendicular to the central body axis; and
  (iii) the foldable arms are configured to transition from the closed state to the open state subsequent to launch, wherein the vehicle is configured to be vertically oriented with respect to gravity at launch;
(c) a rotor mounted to each of the three of more foldable arms, wherein the rotors are controlled by a motor to enable flight, and wherein each rotor is configured to continuously rotate during flight;
(d) sensors mounted on the central body frame, wherein the sensors comprise a range finder, an IMU (inertial measurement unit), and a camera;
(e) the range finder configured to autonomously trigger active stabilization that is controlled by an onboard computer;
(f) the onboard computer comprising a processor and memory, wherein the onboard computer:
  (i) receives input from the sensors;
  (ii) provides attitude control to stabilize the attitude based on the input from the IMU;
  (iii) provides closed-loop altitude control to stabilize a z-position of the vehicle based on the input from the rangefinder; and
  (iv) provides VIO (visual inertial odometry) initialization, and VIO convergence to stabilize an x-position and a y-position of the vehicle based on the input from the camera; and
wherein a configuration of the vehicle is ballistically stable during launch and actively stable during flight.

14. The vehicle of claim 13, wherein:
the central body frame comprises a three-dimensional (3D) printed aeroshell structure.

15. The vehicle of claim 13, wherein:
the central body frame comprises multiple plates that are separated by support columns that transmit a launch load via the central body frame.

16. The vehicle of claim 13, further comprising:
a nosecone coupled to the central body frame, wherein the nosecone comprises a three-dimensional (3D) printed nosecone that reduces drag compared to drag resulting from a bluff body nose.

17. The vehicle of claim 13, wherein:
the vehicle is configured to be launched from a launch tube;
the three or more foldable arms exist in the closed state by being constrained by the launch tube; and
the three or more foldable arms transition to the open state immediately after the vehicle leaves the launch tube via a torsional spring inside the hinge.

18. The vehicle of claim 13, wherein:
transitioning to the open state of the foldable arms is controlled by a delay arm release mechanism.

19. The vehicle of claim 18, wherein:
the delay arm release mechanism comprises a nichrome burn-wire trigger that cuts through a restraining loop of monofilament line.

20. The vehicle of claim 13, further comprising:
a spring-loaded latch to keep the three or more foldable arms rigidly open after transitioning to the open state.

21. The vehicle of claim 13, wherein the onboard computer provides VIO initialization based on:
pitch and roll rates of the vehicle below a defined pitch-roll threshold;
a vertical velocity below a vertical velocity threshold; and
a lateral velocity below a lateral velocity threshold.

* * * * *